(12) United States Patent
Bradley et al.

(10) Patent No.: US 10,944,821 B2
(45) Date of Patent: Mar. 9, 2021

(54) SYSTEM AND METHOD FOR SYNCHRONIZING MEDIA PRESENTATION AT MULTIPLE RECIPIENTS

(71) Applicant: Apple Inc., Cupertino, CA (US)

(72) Inventors: Bob Bradley, San Jose, CA (US);
Robert Dale Newberry, Jr., Cupertino, CA (US)

(73) Assignee: Apple Inc., Cupertino, CA (US)

( * ) Notice: Subject to any disclaimer, the term of this patent is extended or adjusted under 35 U.S.C. 154(b) by 24 days.

(21) Appl. No.: 16/295,267

(22) Filed: Mar. 7, 2019

(65) Prior Publication Data

US 2019/0334985 A1 Oct. 31, 2019

Related U.S. Application Data

(63) Continuation of application No. 15/659,603, filed on Jul. 25, 2017, now Pat. No. 10,264,070, which is a
(Continued)

(51) Int. Cl.
*H04L 29/08* (2006.01)
*H04N 21/8547* (2011.01)
(Continued)

(52) U.S. Cl.
CPC .... *H04L 67/1095* (2013.01); *H04L 29/06027* (2013.01); *H04L 65/601* (2013.01);
(Continued)

(58) Field of Classification Search
CPC .............. H04L 67/1095; H04L 65/601; H04N 21/8547; H04N 21/4305
See application file for complete search history.

(56) References Cited

U.S. PATENT DOCUMENTS 4,807,224 A 2/1989 Naron et al.
5,534,911 A 7/1996 Levitan
(Continued)

FOREIGN PATENT DOCUMENTS

EP 0146334 A2 6/1985
EP 0830026 A2 3/1998
(Continued)

OTHER PUBLICATIONS

Compaq Computer Corp., "Personal Jukebox," 2 pgs, Jan. 24, 2001 (downloaded from http://research.compaq.com/SRC/pjb/).
(Continued)

*Primary Examiner* — Mohammad S Anwar
(74) *Attorney, Agent, or Firm* — Invoke

(57) ABSTRACT

A network media delivery system includes client devices and a host device. Each client device has a network interface, an engine for processing media data, and a media interface. The host device, which can be a computer, establishes network communication links with the client devices, which can be networked media stations, and sends media data to the client devices. The media data can be sent wirelessly as packets of media data transmitted at intervals to each client device. In one embodiment, the host device controls processing of media data such that processed media is delivered in a synchronized manner at each of the client devices. In another embodiment, the host device controls processing of media data such that processed media is delivered in a synchronized manner at the host device and at least one client device.

20 Claims, 12 Drawing Sheets

Related U.S. Application Data continuation of application No. 14/167,742, filed on Jan. 29, 2014, now Pat. No. 9,729,630, which is a continuation of application No. 11/696,679, filed on Apr. 4, 2007, now Pat. No. 8,681,822, which is a continuation of application No. 11/306,557, filed on Jan. 2, 2006, now abandoned, which is a continuation-in-part of application No. 10/862,115, filed on Jun. 4, 2004, now Pat. No. 8,797,926.

(51) Int. Cl.
  *H04N 21/43* (2011.01)
  *H04L 29/06* (2006.01)
  *H04N 21/242* (2011.01)
  *H04L 12/18* (2006.01)

(52) U.S. Cl.
  CPC ....... *H04N 21/242* (2013.01); *H04N 21/4305* (2013.01); *H04N 21/8547* (2013.01); *H04L 12/18* (2013.01)

(56) References Cited

U.S. PATENT DOCUMENTS

| | | |
|---|---|---|
| 5,535,381 A | 7/1996 | Kopper |
| 5,553,222 A | 9/1996 | Milne et al. |
| 5,559,945 A | 9/1996 | Beaudet et al. |
| 5,583,993 A | 12/1996 | Foster et al. |
| 5,587,404 A | 12/1996 | Kroener et al. |
| 5,613,863 A | 3/1997 | Klaus et al. |
| 5,616,876 A | 4/1997 | Cluts |
| 5,640,566 A | 6/1997 | Victor et al. |
| 5,664,044 A | 9/1997 | Ware |
| 5,664,226 A | 9/1997 | Czako et al. |
| 5,666,530 A | 9/1997 | Clark et al. |
| 5,696,948 A | 12/1997 | Cruz et al. |
| 5,709,521 A | 1/1998 | Glass et al. |
| 5,710,922 A | 1/1998 | Alley et al. |
| 5,721,949 A | 2/1998 | Smith et al. |
| 5,722,041 A | 2/1998 | Freadman |
| 5,727,202 A | 3/1998 | Kucala |
| 5,739,451 A | 4/1998 | Winksy et al. |
| 5,745,583 A | 4/1998 | Koizumi et al. |
| 5,751,997 A | 5/1998 | Kullick et al. |
| 5,790,521 A | 8/1998 | Lee et al. |
| 5,815,297 A | 9/1998 | Ciciora |
| 5,835,721 A | 11/1998 | Donahue et al. |
| 5,835,732 A | 11/1998 | Kikinis et al. |
| 5,845,282 A | 12/1998 | Alley et al. |
| 5,864,868 A | 1/1999 | Contois |
| 5,867,668 A | 2/1999 | Spirakis et al. |
| 5,875,354 A | 2/1999 | Charlton et al. |
| 5,918,213 A | 6/1999 | Bernard et al. |
| 5,918,303 A | 6/1999 | Yamaura et al. |
| 5,923,757 A | 7/1999 | Hocker et al. |
| 5,925,843 A | 7/1999 | Miller et al. |
| 5,931,906 A | 8/1999 | Fidelibus et al. |
| 5,953,350 A | 9/1999 | Higgins |
| 5,963,916 A | 10/1999 | Kaplan |
| 5,969,283 A | 10/1999 | Looney et al. |
| 6,000,000 A | 12/1999 | Hawkins et al. |
| 6,006,274 A | 12/1999 | Hawkins et al. |
| 6,008,777 A | 12/1999 | Yiu |
| 6,038,199 A | 3/2000 | Pawlowski et al. |
| 6,041,023 A | 3/2000 | Lakhansingh |
| 6,061,306 A | 5/2000 | Buchheim |
| 6,085,252 A | 7/2000 | Zhu et al. |
| 6,092,119 A | 7/2000 | Rossmere et al. |
| 6,101,591 A | 8/2000 | Foster et al. |
| 6,125,369 A | 9/2000 | Wu et al. |
| 6,138,245 A | 10/2000 | Son et al. |
| 6,166,314 A | 12/2000 | Weinstock et al. |
| 6,172,948 B1 | 1/2001 | Keller et al. |
| 6,208,044 B1 | 3/2001 | Viswanadham et al. |
| 6,212,359 B1 | 4/2001 | Knox |
| 6,216,131 B1 | 4/2001 | Liu et al. |
| 6,240,555 B1 | 5/2001 | Shoff et al. |
| 6,243,328 B1 | 6/2001 | Fenner et al. |
| 6,243,725 B1 | 6/2001 | Hempleman et al. |
| 6,243,772 B1 | 6/2001 | Ghori et al. |
| 6,247,135 B1 | 6/2001 | Feague |
| 6,248,946 B1 | 6/2001 | Dwek |
| 6,263,313 B1 | 7/2001 | Milsted et al. |
| 6,263,503 B1 | 7/2001 | Margulis |
| 6,272,545 B1 | 8/2001 | Flanagin et al. |
| 6,282,714 B1 | 8/2001 | Ghori et al. |
| 6,283,764 B2 | 9/2001 | Kajiyama et al. |
| 6,295,541 B1 | 9/2001 | Bodnar et al. |
| 6,332,175 B1 | 12/2001 | Birrell et al. |
| 6,338,044 B1 | 1/2002 | Cook et al. |
| 6,341,316 B1 | 1/2002 | Kloba et al. |
| 6,345,256 B1 | 2/2002 | Milsted et al. |
| 6,356,971 B1 | 3/2002 | Katz et al. |
| 6,374,177 B1 | 4/2002 | Lee et al. |
| 6,380,947 B1 | 4/2002 | Stead |
| 6,389,467 B1 | 5/2002 | Eyal |
| 6,397,388 B1 | 5/2002 | Allen |
| 6,411,943 B1 | 6/2002 | Crawford |
| 6,429,880 B2 | 8/2002 | Marcos et al. |
| 6,453,281 B1 | 9/2002 | Walters et al. |
| 6,489,986 B1 | 12/2002 | Allen |
| 6,490,432 B1 | 12/2002 | Wegener et al. |
| 6,493,758 B1 | 12/2002 | McLain |
| 6,523,124 B1 | 2/2003 | Lunsford et al. |
| 6,529,233 B1 | 3/2003 | Allen |
| 6,529,804 B1 | 3/2003 | Draggon et al. |
| 6,546,428 B2 | 4/2003 | Baber et al. |
| 6,563,769 B1 | 5/2003 | Van Der Meulen |
| 6,587,403 B1 | 7/2003 | Keller et al. |
| 6,587,404 B1 | 7/2003 | Keller et al. |
| 6,587,480 B1 | 7/2003 | Sanders |
| 6,621,768 B1 | 9/2003 | Keller et al. |
| 6,630,963 B1 | 10/2003 | Billmaier |
| 6,636,873 B1 | 10/2003 | Carini et al. |
| 6,659,861 B1 | 12/2003 | Faris et al. |
| 6,664,981 B2 | 12/2003 | Ashe et al. |
| 6,665,803 B2 | 12/2003 | Lunsford et al. |
| 6,684,060 B1 | 1/2004 | Curtin |
| 6,694,200 B1 | 2/2004 | Naim |
| 6,718,348 B1 | 4/2004 | Novak et al. |
| 6,721,489 B1 | 4/2004 | Benyamin et al. |
| 6,728,585 B2 | 4/2004 | Neoh |
| 6,728,729 B1 | 4/2004 | Jawa et al. |
| 6,731,312 B2 | 5/2004 | Robbin |
| 6,744,738 B1 | 6/2004 | Park et al. |
| 6,757,913 B2 | 6/2004 | Knox |
| 6,760,721 B1 | 7/2004 | Chasen et al. |
| 6,763,345 B1 | 7/2004 | Hempleman et al. |
| 6,766,376 B2 | 7/2004 | Price |
| 6,779,019 B1 | 8/2004 | Mousseau et al. |
| 6,785,542 B1 | 8/2004 | Blight et al. |
| 6,794,566 B2 | 9/2004 | Pachet |
| 6,798,838 B1 | 9/2004 | Ngo |
| 6,801,964 B1 | 10/2004 | Mahdavi |
| 6,831,881 B2 | 12/2004 | Patil et al. |
| 6,845,398 B1 | 1/2005 | Galensky et al. |
| 6,874,037 B1 | 3/2005 | Abram et al. |
| 6,898,159 B2 | 5/2005 | Kudo |
| 6,920,179 B1 | 7/2005 | Anand et al. |
| 6,925,595 B1 | 8/2005 | Whitledge et al. |
| 6,928,433 B2 | 8/2005 | Goodman et al. |
| 6,929,058 B2 | 8/2005 | Liu et al. |
| 6,935,627 B2 | 8/2005 | Jung |
| 6,941,324 B2 | 9/2005 | Plastina et al. |
| 6,944,880 B1 | 9/2005 | Allen |
| 6,947,598 B2 | 9/2005 | Yogeshwar et al. |
| 6,956,562 B1 | 10/2005 | O'Hara et al. |
| 6,959,288 B1 | 10/2005 | Medina et al. |
| 6,959,562 B2 | 11/2005 | Navedo et al. |
| 6,978,127 B1 | 12/2005 | Bulthuis et al. |
| 6,981,259 B2 | 12/2005 | Luman et al. |
| 6,985,966 B1 | 1/2006 | Gupta et al. |
| 6,987,221 B2 | 1/2006 | Platt |

(56) References Cited

U.S. PATENT DOCUMENTS

| | | |
|---|---|---|
| 6,993,532 B1 | 1/2006 | Platt et al. |
| 6,993,722 B1 | 1/2006 | Greer et al. |
| 6,999,826 B1 | 2/2006 | Zhou et al. |
| 7,010,758 B2 | 3/2006 | Bate |
| 7,016,443 B1 | 3/2006 | Splett |
| 7,022,905 B1 | 4/2006 | Hinman et al. |
| 7,024,214 B2 | 4/2006 | Loveland |
| 7,024,491 B1 | 4/2006 | Hanmann et al. |
| 7,024,575 B2 | 4/2006 | Lienhart et al. |
| 7,034,891 B2 | 4/2006 | Joung et al. |
| 7,039,656 B1 | 5/2006 | Tsai et al. |
| 7,047,308 B2 | 5/2006 | Deshpande |
| 7,069,058 B2 | 6/2006 | Kawashima |
| 7,075,000 B2 | 7/2006 | Gang et al. |
| 7,076,204 B2 | 7/2006 | Richenstein et al. |
| 7,082,310 B2 | 7/2006 | Hirayama et al. |
| 7,082,320 B2 | 7/2006 | Kattukaran et al. |
| 7,084,898 B1 | 8/2006 | Firestone et al. |
| 7,096,271 B1 | 8/2006 | Omoigui et al. |
| 7,111,009 B1 | 9/2006 | Gupta et al. |
| 7,130,892 B2 | 10/2006 | Mukai |
| 7,136,934 B2 | 11/2006 | Carter et al. |
| 7,142,934 B2 | 11/2006 | Janik |
| 7,143,939 B2 | 12/2006 | Henzerling |
| 7,146,322 B2 | 12/2006 | Cowgill |
| 7,166,791 B2 | 1/2007 | Robbin et al. |
| 7,174,560 B1 | 2/2007 | Crinon |
| 7,184,774 B2 | 2/2007 | Robinson et al. |
| 7,185,084 B2 | 2/2007 | Sirivara et al. |
| 7,194,692 B2 | 3/2007 | Marcos et al. |
| 7,200,357 B2 | 4/2007 | Janik et al. |
| 7,228,054 B2 | 6/2007 | Cowgill |
| 7,260,714 B2 | 8/2007 | Dawson et al. |
| 7,266,713 B2 | 9/2007 | Lienhart et al. |
| 7,281,141 B2 | 10/2007 | Elkayam et al. |
| 7,283,880 B2 | 10/2007 | Dick |
| 7,289,393 B2 | 10/2007 | Keller et al. |
| 7,295,809 B2 | 11/2007 | Moore |
| 7,295,983 B2 | 11/2007 | Fujiwara et al. |
| 7,302,239 B2 | 11/2007 | Jitsuhara |
| 7,305,691 B2 | 12/2007 | Cristofalo |
| 7,312,785 B2 | 12/2007 | Tsuk et al. |
| 7,330,868 B2 | 2/2008 | Kawasaki et al. |
| 7,336,675 B2 | 2/2008 | Naik et al. |
| 7,343,553 B1 | 3/2008 | Kaye |
| 7,346,698 B2 | 3/2008 | Hannaway |
| 7,359,671 B2 | 4/2008 | Richenstein et al. |
| 7,367,701 B2 | 5/2008 | Lee |
| 7,369,532 B2 | 5/2008 | Silvester |
| 7,370,129 B2 | 5/2008 | Green et al. |
| 7,391,791 B2 | 6/2008 | Balassanian et al. |
| 7,406,294 B1 | 7/2008 | Liu |
| 7,418,472 B2 | 8/2008 | Shoemaker et al. |
| 7,418,673 B2 | 8/2008 | Oh |
| 7,424,024 B2 | 9/2008 | Chen et al. |
| 7,430,753 B2 | 9/2008 | Gray et al. |
| 7,437,158 B2 | 10/2008 | Russell |
| 7,444,388 B1 | 10/2008 | Svendsen |
| 7,447,815 B2 | 11/2008 | Weaver et al. |
| 7,469,283 B2 | 12/2008 | Eyal et al. |
| 7,471,988 B2 | 12/2008 | Smith et al. |
| 7,474,677 B2 | 1/2009 | Trott |
| 7,477,653 B2 | 1/2009 | Smith et al. |
| 7,480,746 B2 | 1/2009 | Simon et al. |
| 7,483,538 B2 | 1/2009 | McCarty et al. |
| 7,502,604 B2 | 3/2009 | Knox |
| 7,505,483 B2 | 3/2009 | Jeon et al. |
| 7,508,815 B2 | 3/2009 | Lapeyre et al. |
| 7,519,681 B2 | 4/2009 | Edwards et al. |
| 7,519,686 B2 | 4/2009 | Hong et al. |
| 7,532,862 B2 | 5/2009 | Cheshire |
| 7,539,777 B1 | 5/2009 | Aitken |
| 7,542,784 B2 | 6/2009 | Passier et al. |
| 7,543,245 B2 | 6/2009 | Irimajiri |
| 7,555,291 B2 | 6/2009 | Waessingbo |
| 7,561,215 B2 | 7/2009 | Kim et al. |
| 7,577,261 B2 | 8/2009 | Liu et al. |
| 7,606,570 B2 | 10/2009 | Karaoguz et al. |
| 7,617,513 B2 | 11/2009 | McCafferty et al. |
| 7,620,011 B2 | 11/2009 | Kim et al. |
| 7,627,343 B2 | 12/2009 | Fadell et al. |
| 7,634,227 B2 | 12/2009 | De Jong |
| 7,647,346 B2 | 1/2010 | Silverman et al. |
| 7,650,470 B2 | 1/2010 | Poo |
| 7,657,706 B2 | 2/2010 | Iyer et al. |
| 7,680,849 B2 | 3/2010 | Heller et al. |
| 7,689,095 B2 | 3/2010 | Sugiyama et al. |
| 7,698,297 B2 | 4/2010 | Jawa et al. |
| 7,698,723 B2 | 4/2010 | Hicks et al. |
| 7,706,901 B2 | 4/2010 | Berreth |
| 7,724,780 B2 | 5/2010 | Baird et al. |
| 7,725,912 B2 | 5/2010 | Margulis |
| 7,734,688 B2 | 6/2010 | Langdon |
| 7,765,326 B2 | 7/2010 | Robbin et al. |
| 7,769,903 B2 | 8/2010 | Robbin et al. |
| 7,797,446 B2 | 9/2010 | Heller et al. |
| 7,821,574 B2 | 10/2010 | Black |
| 7,827,259 B2 | 11/2010 | Heller et al. |
| 7,853,341 B2 | 12/2010 | McCarty et al. |
| 7,890,661 B2 | 2/2011 | Spurgat et al. |
| 7,899,915 B2 | 3/2011 | Reisman |
| 7,903,690 B2 | 3/2011 | Wakid |
| 7,950,037 B2 | 5/2011 | Mensch |
| 7,996,505 B2 | 8/2011 | Krantz et al. |
| 8,037,220 B2 | 10/2011 | Moore et al. |
| 8,041,438 B2 | 10/2011 | Batson et al. |
| 8,169,938 B2 | 5/2012 | Duchscher et al. |
| 8,171,177 B2 | 5/2012 | Rostaing et al. |
| 8,184,657 B2 | 5/2012 | Dacosta |
| 8,185,674 B2 | 5/2012 | Moore et al. |
| 8,214,447 B2 | 7/2012 | Deslippe et al. |
| 8,266,657 B2 | 9/2012 | Margulis |
| 8,284,739 B2 | 10/2012 | Doyle et al. |
| 8,285,727 B2 | 10/2012 | Weber et al. |
| 8,374,087 B2 | 2/2013 | Dacosta |
| 8,423,893 B2 | 4/2013 | Ramsay et al. |
| 8,443,038 B2 | 5/2013 | Robbin et al. |
| 8,539,533 B2 | 9/2013 | Caspi et al. |
| 8,689,036 B2 | 4/2014 | Millington et al. |
| 8,797,926 B2 | 8/2014 | Kearney et al. |
| 8,918,541 B2 | 12/2014 | Morrison et al. |
| 8,957,972 B2 | 2/2015 | Gluskin et al. |
| 9,182,777 B2 | 11/2015 | Millington |
| 9,189,011 B2 | 11/2015 | Millington |
| 9,195,258 B2 | 11/2015 | Millington |
| 9,207,905 B2 | 12/2015 | Millington |
| 9,417,689 B1 | 8/2016 | Ramaswamy |
| 9,448,683 B2 | 9/2016 | Robbin et al. |
| 9,729,630 B2 | 8/2017 | Bradley et al. |
| 9,763,018 B1 | 9/2017 | McPherson et al. |
| 9,826,012 B2 | 11/2017 | Hao et al. |
| 10,209,953 B2 | 2/2019 | Millington |
| 10,362,346 B2 | 7/2019 | Mayalil et al. |
| 10,439,896 B2 | 10/2019 | Millington et al. |
| 2001/0004310 A1 | 6/2001 | Kono |
| 2001/0008535 A1 | 7/2001 | Lanigan |
| 2001/0011308 A1 | 8/2001 | Clark et al. |
| 2001/0018858 A1 | 9/2001 | Dwek |
| 2001/0021053 A1 | 9/2001 | Colbourne et al. |
| 2001/0021305 A1 | 9/2001 | Sugiyama et al. |
| 2001/0021998 A1 | 9/2001 | Margulis |
| 2001/0041021 A1 | 11/2001 | Boyle et al. |
| 2001/0044835 A1 | 11/2001 | Schober et al. |
| 2001/0048642 A1 | 12/2001 | Berhan |
| 2001/0052123 A1 | 12/2001 | Kawai |
| 2002/0002413 A1 | 1/2002 | Tokue |
| 2002/0013784 A1 | 1/2002 | Swanson |
| 2002/0013852 A1 | 1/2002 | Janik |
| 2002/0013853 A1 | 1/2002 | Baber et al. |
| 2002/0019984 A1 | 2/2002 | Rakib |
| 2002/0022453 A1 | 2/2002 | Balog et al. |
| 2002/0045960 A1 | 4/2002 | Phillips et al. |
| 2002/0046315 A1 | 4/2002 | Miller et al. |
| 2002/0055934 A1 | 5/2002 | Lipscomb et al. |

(56) References Cited

U.S. PATENT DOCUMENTS

| | | |
|---|---|---|
| 2002/0073139 A1 | 6/2002 | Hawkins et al. |
| 2002/0074413 A1 | 6/2002 | Henzerling |
| 2002/0078075 A1 | 6/2002 | Colson et al. |
| 2002/0081098 A1 | 6/2002 | Scally |
| 2002/0095663 A1 | 7/2002 | Joory |
| 2002/0103554 A1 | 8/2002 | Coles et al. |
| 2002/0113824 A1 | 8/2002 | Myers |
| 2002/0116082 A1 | 8/2002 | Gudorf |
| 2002/0118848 A1 | 8/2002 | Karpenstein |
| 2002/0133515 A1 | 9/2002 | Kagle et al. |
| 2002/0133824 A1 | 9/2002 | Mensch |
| 2002/0138606 A1 | 9/2002 | Robison |
| 2002/0156921 A1 | 10/2002 | Dutta et al. |
| 2002/0161865 A1 | 10/2002 | Nguyen |
| 2002/0164973 A1 | 11/2002 | Janik et al. |
| 2002/0174243 A1 | 11/2002 | Spurgat et al. |
| 2002/0174269 A1 | 11/2002 | Spurgat et al. |
| 2002/0194309 A1 | 12/2002 | Carter et al. |
| 2002/0196912 A1 | 12/2002 | Norris |
| 2003/0013332 A1 | 1/2003 | Lin |
| 2003/0013492 A1 | 1/2003 | Bokhari et al. |
| 2003/0013493 A1 | 1/2003 | Irimajiri et al. |
| 2003/0030733 A1 | 2/2003 | Seaman et al. |
| 2003/0037254 A1 | 2/2003 | Fischer et al. |
| 2003/0045955 A1 | 3/2003 | Janik |
| 2003/0046434 A1 | 3/2003 | Flanagin et al. |
| 2003/0050058 A1 | 3/2003 | Walsh et al. |
| 2003/0065802 A1 | 4/2003 | Vitikainen et al. |
| 2003/0074457 A1 | 4/2003 | Kluth |
| 2003/0076301 A1 | 4/2003 | Tsuk et al. |
| 2003/0079038 A1 | 4/2003 | Robbin et al. |
| 2003/0083954 A1 | 5/2003 | Namba |
| 2003/0097379 A1 | 5/2003 | Ireton |
| 2003/0112279 A1 | 6/2003 | Irimajiri |
| 2003/0120742 A1 | 6/2003 | Ohgami et al. |
| 2003/0131360 A1 | 7/2003 | Joung et al. |
| 2003/0134589 A1 | 7/2003 | Oba |
| 2003/0158737 A1 | 8/2003 | Csicsatka |
| 2003/0167318 A1 | 9/2003 | Robbin et al. |
| 2003/0181203 A1 | 9/2003 | Cheshire |
| 2003/0182315 A1 | 9/2003 | Plastina et al. |
| 2003/0191756 A1 | 10/2003 | Oh |
| 2003/0197725 A1 | 10/2003 | Tuli |
| 2003/0210821 A1 | 11/2003 | Yogeshwar et al. |
| 2003/0221161 A1 | 11/2003 | Balassanian et al. |
| 2003/0221541 A1 | 12/2003 | Platt |
| 2003/0229900 A1 | 12/2003 | Reisman |
| 2004/0001395 A1 | 1/2004 | Keller et al. |
| 2004/0001396 A1 | 1/2004 | Keller et al. |
| 2004/0001494 A1 | 1/2004 | Barrack et al. |
| 2004/0003151 A1 | 1/2004 | Bateman et al. |
| 2004/0004338 A1 | 1/2004 | Jung |
| 2004/0017997 A1 | 1/2004 | Cowgill |
| 2004/0027930 A1 | 2/2004 | Kudo |
| 2004/0031058 A1 | 2/2004 | Reisman |
| 2004/0045030 A1 | 3/2004 | Reynolds et al. |
| 2004/0055446 A1 | 3/2004 | Robbin et al. |
| 2004/0057446 A1 | 3/2004 | Varsa et al. |
| 2004/0068536 A1 | 4/2004 | Demers et al. |
| 2004/0072584 A1 | 4/2004 | Kern |
| 2004/0076086 A1 | 4/2004 | Keller et al. |
| 2004/0078416 A1 | 4/2004 | Kawasaki et al. |
| 2004/0128198 A1 | 7/2004 | Register et al. |
| 2004/0128402 A1 | 7/2004 | Weaver et al. |
| 2004/0132510 A1 | 7/2004 | Yamashita |
| 2004/0133908 A1 | 7/2004 | Smith et al. |
| 2004/0139180 A1 | 7/2004 | White et al. |
| 2004/0139233 A1 | 7/2004 | Kellerman et al. |
| 2004/0139844 A1 | 7/2004 | Tsuboi |
| 2004/0143442 A1 | 7/2004 | Knight |
| 2004/0157548 A1 | 8/2004 | Eyer |
| 2004/0174896 A1 | 9/2004 | Caspi et al. |
| 2004/0177063 A1 | 9/2004 | Weber et al. |
| 2004/0177371 A1 | 9/2004 | Caspi et al. |
| 2004/0177377 A1 | 9/2004 | Lin et al. |
| 2004/0179540 A1 | 9/2004 | Lee et al. |
| 2004/0193900 A1 | 9/2004 | Nair |
| 2004/0215611 A1 | 10/2004 | Jawa et al. |
| 2004/0215810 A1 | 10/2004 | Tan et al. |
| 2004/0216108 A1 | 10/2004 | Robbin |
| 2004/0220926 A1* | 11/2004 | Lamkin ............ G06F 21/10 |
| 2004/0221088 A1 | 11/2004 | Lisitsa et al. |
| 2004/0223622 A1 | 11/2004 | Lindemann et al. |
| 2004/0225762 A1 | 11/2004 | Poo |
| 2004/0234088 A1 | 11/2004 | McCarty et al. |
| 2004/0236568 A1 | 11/2004 | Guillen et al. |
| 2004/0242224 A1 | 12/2004 | Janik et al. |
| 2004/0250273 A1 | 12/2004 | Swix et al. |
| 2004/0252604 A1 | 12/2004 | Johnson et al. |
| 2004/0255326 A1 | 12/2004 | Hicks et al. |
| 2004/0261040 A1 | 12/2004 | Radcliffe et al. |
| 2004/0261112 A1 | 12/2004 | Hicks et al. |
| 2004/0267825 A1 | 12/2004 | Novak et al. |
| 2005/0010616 A1 | 1/2005 | Burks |
| 2005/0055444 A1 | 3/2005 | Venkatasubramanian |
| 2005/0071375 A1 | 3/2005 | Houghton et al. |
| 2005/0080915 A1 | 4/2005 | Shoemaker et al. |
| 2005/0089052 A1 | 4/2005 | Chen et al. |
| 2005/0147130 A1 | 7/2005 | Hurwitz et al. |
| 2005/0174488 A1 | 8/2005 | Chennakeshu |
| 2005/0201360 A1 | 9/2005 | Redstone |
| 2005/0201398 A1 | 9/2005 | Naik et al. |
| 2005/0207726 A1 | 9/2005 | Chen |
| 2005/0210101 A1* | 9/2005 | Janik ............ H04L 67/2842 709/203 |
| 2005/0226233 A1 | 10/2005 | Kryuchkov et al. |
| 2005/0235015 A1 | 10/2005 | Abanami et al. |
| 2005/0235048 A1 | 10/2005 | Costa-Requena et al. |
| 2005/0240494 A1 | 10/2005 | Cue et al. |
| 2005/0240661 A1 | 10/2005 | Heller et al. |
| 2005/0240745 A1 | 10/2005 | Iyer et al. |
| 2005/0254447 A1 | 11/2005 | Miller-Smith |
| 2005/0262528 A1 | 11/2005 | Herley et al. |
| 2005/0265316 A1 | 12/2005 | Liu et al. |
| 2005/0273790 A1 | 12/2005 | Kearney et al. |
| 2005/0289224 A1 | 12/2005 | Deslippe et al. |
| 2006/0007943 A1 | 1/2006 | Fellman |
| 2006/0015580 A1 | 1/2006 | Gabriel et al. |
| 2006/0027080 A1 | 2/2006 | Schultz |
| 2006/0030961 A1 | 2/2006 | Lin |
| 2006/0062242 A1 | 3/2006 | Dacosta |
| 2006/0062243 A1 | 3/2006 | Dacosta |
| 2006/0067463 A1 | 3/2006 | Hack et al. |
| 2006/0069724 A1 | 3/2006 | Langdon |
| 2006/0074637 A1 | 4/2006 | Berreth |
| 2006/0083194 A1 | 4/2006 | Dhrimaj et al. |
| 2006/0090202 A1 | 4/2006 | Liu et al. |
| 2006/0092844 A1 | 5/2006 | Jeon et al. |
| 2006/0100978 A1 | 5/2006 | Heller et al. |
| 2006/0106806 A1 | 5/2006 | Sperling et al. |
| 2006/0117371 A1 | 6/2006 | Margulis |
| 2006/0126667 A1 | 6/2006 | Smith et al. |
| 2006/0143455 A1 | 6/2006 | Gitzinger |
| 2006/0159109 A1 | 7/2006 | Lamkin et al. |
| 2006/0167982 A1 | 7/2006 | Jawa et al. |
| 2006/0168340 A1 | 7/2006 | Heller et al. |
| 2006/0168351 A1 | 7/2006 | Ng et al. |
| 2006/0224620 A1 | 10/2006 | Silverman et al. |
| 2006/0245451 A1 | 11/2006 | Wakid |
| 2006/0253279 A1 | 11/2006 | Sung |
| 2006/0274747 A1 | 12/2006 | Duchscher et al. |
| 2006/0277216 A1 | 12/2006 | Shukhman |
| 2006/0288057 A1 | 12/2006 | Collins et al. |
| 2007/0033052 A1 | 2/2007 | Cowgill |
| 2007/0038941 A1 | 2/2007 | Wysocki et al. |
| 2007/0067309 A1 | 3/2007 | Klein et al. |
| 2007/0067808 A1 | 3/2007 | Dacosta |
| 2007/0073723 A1 | 3/2007 | Ramer et al. |
| 2007/0073728 A1 | 3/2007 | Klein et al. |
| 2007/0074118 A1 | 3/2007 | Robbin et al. |
| 2007/0084333 A1 | 4/2007 | Robbin et al. |
| 2007/0088727 A1 | 4/2007 | Kindig |
| 2007/0088764 A1 | 4/2007 | Yoon et al. |
| 2007/0110074 A1 | 5/2007 | Bradley et al. |

(56) References Cited

U.S. PATENT DOCUMENTS

| | | |
|---|---|---|
| 2007/0124680 A1 | 5/2007 | Robbin et al. |
| 2007/0130541 A1 | 6/2007 | Louch et al. |
| 2007/0169115 A1 | 7/2007 | Ko et al. |
| 2007/0185919 A1 | 8/2007 | Kaplan et al. |
| 2007/0203954 A1 | 8/2007 | Vargas et al. |
| 2007/0220552 A1 | 9/2007 | Juster et al. |
| 2007/0250761 A1 | 10/2007 | Bradley et al. |
| 2007/0271312 A1 | 11/2007 | Heller et al. |
| 2007/0291323 A1 | 12/2007 | Roncal |
| 2008/0018927 A1 | 1/2008 | Martin et al. |
| 2008/0028008 A1 | 1/2008 | Brunet et al. |
| 2008/0040758 A1 | 2/2008 | Beetcher et al. |
| 2008/0065247 A1 | 3/2008 | Igoe |
| 2008/0086494 A1 | 4/2008 | Heller et al. |
| 2008/0164581 A1 | 7/2008 | Cho et al. |
| 2008/0168185 A1 | 7/2008 | Robbin et al. |
| 2008/0168245 A1 | 7/2008 | De et al. |
| 2008/0168391 A1 | 7/2008 | Robbin et al. |
| 2008/0168525 A1 | 7/2008 | Heller et al. |
| 2008/0168526 A1 | 7/2008 | Robbin et al. |
| 2008/0229335 A1 | 9/2008 | Robbin et al. |
| 2009/0006671 A1 | 1/2009 | Batson et al. |
| 2009/0172200 A1 | 7/2009 | Morrison et al. |
| 2009/0290725 A1 | 11/2009 | Huang |
| 2010/0309962 A1 | 12/2010 | Freundlich et al. |
| 2011/0210820 A1 | 9/2011 | Talty et al. |
| 2011/0264732 A1 | 10/2011 | Robbin et al. |
| 2012/0180093 A1 | 7/2012 | Ishihara et al. |
| 2013/0058593 A1 | 3/2013 | Kanalakis et al. |
| 2013/0174208 A1 | 7/2013 | Lee et al. |
| 2013/0311694 A1 | 11/2013 | Bhamidipati et al. |
| 2014/0006946 A1 | 1/2014 | Robbin et al. |
| 2014/0006947 A1 | 1/2014 | Garmark et al. |
| 2014/0037097 A1 | 2/2014 | Labosco |
| 2014/0096165 A1 | 4/2014 | Bei et al. |
| 2014/0178028 A1 | 6/2014 | Park et al. |
| 2014/0244863 A1 | 8/2014 | Bradley et al. |
| 2014/0250219 A1 | 9/2014 | Hwang |
| 2014/0307585 A1 | 10/2014 | Kearney et al. |
| 2014/0351876 A1 | 11/2014 | Kano |
| 2015/0181286 A1 | 6/2015 | Gonzalez |
| 2015/0373401 A1 | 12/2015 | Kwon et al. |
| 2016/0044367 A1 | 2/2016 | Matsubara et al. |
| 2016/0066184 A1 | 3/2016 | Bhargav-Spantzel et al. |
| 2016/0073197 A1 | 3/2016 | Hammer et al. |
| 2016/0198198 A1 | 7/2016 | Iwami et al. |
| 2016/0219329 A1 | 7/2016 | Jee et al. |
| 2016/0255391 A1 | 9/2016 | Noble |
| 2017/0019443 A1 | 1/2017 | Conan et al. |
| 2017/0054774 A1 | 2/2017 | Robbin et al. |
| 2017/0242653 A1 | 8/2017 | Lang et al. |
| 2017/0242656 A1 | 8/2017 | Plagge et al. |
| 2018/0070122 A1 | 3/2018 | Baek et al. |
| 2018/0167373 A1 | 6/2018 | Anderson et al. |

FOREIGN PATENT DOCUMENTS

| | | |
|---|---|---|
| EP | 0917077 A2 | 5/1999 |
| EP | 0982732 A1 | 3/2000 |
| EP | 1028425 A2 | 8/2000 |
| EP | 1112931 A2 | 7/2001 |
| EP | 1122931 A2 | 8/2001 |
| EP | 1143719 A2 | 10/2001 |
| EP | 1353269 A2 | 10/2003 |
| EP | 1408427 A2 | 4/2004 |
| EP | 1429569 A1 | 6/2004 |
| EP | 1463334 A2 | 9/2004 |
| EP | 1523171 A1 | 4/2005 |
| EP | 1548740 A2 | 6/2005 |
| EP | 1751949 A1 | 2/2007 |
| EP | 2360887 A1 | 8/2011 |
| EP | 2375678 A1 | 10/2011 |
| JP | 2000-339917 A | 12/2000 |
| JP | 2001-093226 A | 4/2001 |
| JP | 2001-117800 A | 4/2001 |
| JP | 2003-077214 A | 3/2003 |
| JP | 2003-303137 A | 10/2003 |
| JP | 2003-319485 A | 11/2003 |
| KR | 10-2001-0063284 A | 7/2001 |
| KR | 10-2001-0079176 A | 8/2001 |
| KR | 10-2002-0001127 A | 1/2002 |
| KR | 10-2002-0011027 A | 2/2002 |
| KR | 10-2006-0035634 A | 4/2006 |
| KR | 10-0599204 B1 | 7/2006 |
| WO | 94/08337 A1 | 4/1994 |
| WO | 95/16950 A1 | 6/1995 |
| WO | 00/16533 A1 | 3/2000 |
| WO | 00/43914 A1 | 7/2000 |
| WO | 01/26374 A1 | 4/2001 |
| WO | 01/33569 A1 | 5/2001 |
| WO | 01/67753 A1 | 9/2001 |
| WO | 02/25610 A1 | 3/2002 |
| WO | 02/25935 A2 | 3/2002 |
| WO | 02/65723 A1 | 8/2002 |
| WO | 02/65732 A1 | 8/2002 |
| WO | 2003/009601 A1 | 1/2003 |
| WO | 2003/023786 A2 | 3/2003 |
| WO | 03/38637 A1 | 5/2003 |
| WO | 2003/036541 A1 | 5/2003 |
| WO | 2004/004338 A1 | 1/2004 |
| WO | 2004/034286 A1 | 4/2004 |
| WO | 2004/057474 A1 | 7/2004 |
| WO | 2004/084413 A2 | 9/2004 |
| WO | 2005/060387 A2 | 7/2005 |
| WO | 2005/114472 A1 | 12/2005 |
| WO | 2005/122531 A1 | 12/2005 |
| WO | 2006/007322 A2 | 1/2006 |
| WO | 2006/047578 A2 | 5/2006 |
| WO | 2007/079360 A1 | 7/2007 |
| WO | 2007/079334 A3 | 8/2007 |
| WO | 2008/033771 A2 | 3/2008 |

OTHER PUBLICATIONS

Clifton, David, pipe.c, A Kla2 Module, 2003, 10 pages. Retrieved on Oct. 17, 2011 from http://www.codelode.com/Kernel/k1a2pepec.html.

Clifton, "Pipe.c, A Kla2 Module," 8 pgs, 2003 (retrieved Oct. 17, 2011 from http://www.codelode.com/Kernel/k1a2pepec.html, downloaded Apr. 18, 2012 from http://web.archive.org/2004010719482/http://www.codelode.com/Ke- rnel/kla2pipec . . . ).

Butler, "Portable MP3: The Nomad Jukebox," Aug. 1, 2001 (http:lldb.tidbits.com/getbits.acgi? tbart=06261, downloaded Jul. 13, 2011 from http://www.tidbits.com/article/6261).

Butler, "Archos Jukebox 6000 Challenges Nomad Jukebox," 6 pgs, Aug. 13, 2001 (from http://db.tidbits.com/getbits.acgi?tbart=06521 (downloaded Jul. 13, 2011 from http://www.tidbits.com/article/6521?printversion=1).

Bridgman, "Windows XP Expert Zone Community Columnist", Using Windows Mobile-based Portable Media Centers and Windows Media Player 10, Aug. 25, 2004, 1-11. (U.S. Appl. No. 11/519,429).

Bott, "Special Edition Using Microsoft 1-18 Windows Millennium Passage", Special Edition Using Microsoft Windows Millennium Edition, Nov. 3, 2000, pp. 1-24. (U.S. Appl. No. 11/519,429).

Awbrey, "Apple's iPod Available in Stores Tomorrow," Press Release, Nov. 9, 2001 (downloaded Jul. 14, 2011 from http://www.apple.com/pr/library/2001/11/09Apple-s-iPod-Available).

Apple, "Mac OS X: Bonjour," Technology Brief, Apr. 2005, 6-pgs.

Apple, "AirPort Express," Technology Overview, Jul. 2004, 31-pgs.

Apple Introduces iTunes—World's Best and Easiest to Use Jukebox Software, Macworld Expo, San Francisco, Jan. 9, 2011 [.about.2 pages Downloaded on Jul. 14, 2011 at http://www.apple.com/pr/library/2001/01/09Apple-Introduces-iTunes-Worlds- Best and Ea . . . ] (U.S. Appl. No. 11/519,429).

Apple Inc., "iTunes, Playlist Related Help Screens," iTunes v1.0, 8 pgs, Jan. 2001.

Apple Inc., "iTunes, Digital Music for your Mac," 2 pgs (downloaded Oct. 22, 2001 from http://www.apple.com/itunes/).

(56) References Cited

OTHER PUBLICATIONS

Apple Inc., "iTunes 2, Digital Music for the Mac," Specification Sheet, 2 pgs, Oct. 2001.
Apple Inc., "Apple-Downloads-Dashboard," 1 pg (downloaded Apr. 2016 from http://www.apple.com/downloads/dashboard).
Apple Inc., "Apple-Downloads-Dashboard", http://www.apple.com/downloads/dashboard, downloaded Dec. 16, 2008, pp. 102 (U.S. Appl. No. 11/519,429).
Apple Inc., "Apple Announces iTunes 2," Press Release, 2 pgs, Oct. 23, 2001 (downloaded from http://www.apple.com/pr/library/2001/10/23Appl e-Announces-iTunes-2.html).
Apple Inc. "Apple Introduces iTunes—World's Best and Easiest to Use Jukebox Software," MacWorld Expo, San Francisco, 2 pgs, Jan. 9, 2001 (https://www.apple.com/pr/library/2001/01/09Apple-Introduces-iTunes-Worlds-Best-and-Easiest- To-Use-Jukebox-S.
Andy Lindauer, "What's in you Pocket?," Edgereview, downloaded Jan. 25, 2002, http://www.edgereview.com/print.cfm?Type+aag&ID=286 (U.S. Appl. No. 11/519,429).
Andrew Birrell, "Personal Jukebox (PJB)," Oct. 13, 2000 available from http://birrell.org/andrew/talks/pjb-overview.ppt. (U.S. Appl. No. 11/519,429).
Alicia Awbrey, press release entitled "Apple's iPod Available in Stores Tomorrow," Nov. 9, 2001 [downloaded Jul. 14, 2011 at http://www.apple.com/pr/library/2001/11/09Apple-s-iPod-Available] (U.S. Appl. No. 11/519,429).
Adam C. Engst. "SoundJam Keeps on Jammin'." Jun. 19, 2000, available from http://db.tidbits.com/getbits.acgi?tbart=05988. downloaded Jul. 25, 2011 at http?..db.tidbits.com/article/5988?print?version+1 (U.S. Appl. No. 11/519,429).
AccelerateYourMac.com, Apple posts Automated Scripts for iTunes 2.03, 9 pgs, 2001 (downloaded Apr. 11, 2012 from http://www.xlr8yourmac.com/archive/dec01/121801.html).
About MusicMatch Jukebox, MusicMatch Jukebox v4 Help. pp. 1-4, (1999) (U.S. Appl. No. 11/519,429).
Zheng et al., "MobiGATE: a mobile gateway proxy for the active deployment of transport entities," Proceedings of the 2004 International Conference on Parallel Processing, Piscataway, NJ, Aug. 15, 2004 pp. 1-8 from IEEE on Jul. 2011 (U.S. Appl. No. 11/519,429).
Window's Media Player 6.4, Microsoft Corp., copyright 1999, software available at http://www.oldversion.com/program.php?n=wmp [.about.Downloaded Jul. 13, 2011 at: http://www.microsoft.com/download.en/confirmation.axps?displaylang-en&id=- 22758] (U.S. Appl. No. 11/519,429).
Wikipedia: "iTunes", www.wikipedia.com, May 9, 2005, 6 pages. (U.S. Appl. No. 11/519,429).
Wikipedia, "IEEE 1394," 13 pgs (Firewire and also known as Sony's iLink) (downloaded from https://en.wikipedia.org/wiki/IEEE.sub.-1394).
WebReviews.com, "Rio Portable Music Player," 2 pgs, 1999 (downloaded Jan. 25, 2002 from download http://www.webreviews.com/9901/rio.html).
Vetro et al., "Media Conversions to Support Mobile Users," IEEE Canadian Conference on Electrical and Computer Engineering, Piscataway, NJ, May 13, 2001, pp. 606-612 pp. 1-6 from IEEE on Jul. 2011 (U.S. Appl. No. 11/519,429).
TuneBase Pro Mk-II User's Guide, Escient, Inc., (1999) Downloaded Jul. 25, 2011 (U.S. Appl. No. 11/519,429).
TuneBase 100 User Guide, A CD Library Management System, Escient, Inc. copyright 1999. (101 Pages) (U.S. Appl. No. 11/519,429).
Travis Butler, "Portable MP3: The Nomad Jukebox," Aug. 1, 2001, available from http://db.tidbits.com/getbits.acgi?tbart=06261. downloaded Jul. 13, 2011 at http://www.tidbits.com/article/6261 (U.S. Appl. No. 11/519,429).
Travis Butler, "Archos Jukebox 6000 Challenges Nomad Jukebox," Aug. 13, 2001, available from http://db.tidbits.com/getbits.acgi?tbart=06521—Downloaded Jul. 13, 2011 @ http://www.tidbits.com/article/6521?printversion=1 (U.S. Appl. No. 11/519,429).
Top Stores of Dec. 18, 2001: Apple posts Automated Scripts for iTunes 2.03. downloaded 9 pages on Apr. 11, 2012 from the internet at: http://www.xlr8yourmac.com/archive/dec01/121801.html (U.S. Appl. No. 11/519,429).
Titmus, Richard, "Softsqueeze 2.0", obtained from http://softsqueeze.sourceforge.net!, generated Jun. 8, 2006, copyright 2004, 2005, 3 pgs.
Stewart et al., "Request for Comments: 3758," Network Working Group, May 2004, 22-pgs.
Steinberg, "Sonicblue Rio Car," Product Review, Dec. 12, 2000, http://electronics.cnet.com/electronics/0-6342420-1304-4098389.html. (U.S. Appl. No. 11/519,429).
SoundJam MP Plus, Representative Screens, published by Cassady & Greene, Inc., Salinas, CA 2000. (U.S. Appl. No. 11/519,429).
SoundJam MP Plus Manual, version 2.0—MP3 Player and Encoder for Macintosh by Jeffrey Robbin, Bill Kincaid and Dave Heller, manual by Tom Negrino, published by Casady & Greene, Inc. 2000. 80 pages (U.S. Appl. No. 11/519,429).
snarfed.org, "libmsntp," obtained from http://snarfed.org/space/libmsntp, generated Jun. 8, 2006, undated, 2-pgs.
snarfed.org, "History of Synchronizing mp3 playback," http://snarfed.org/exec/history?name=synchronizing+mp3+playback, generated Jun. 8, 2006, 2 pgs.
Slim Devices. Inc. "Slim Devices: Support: FAQ." obtained from http://www.slimdevices.com/su_faq.html. generated Jun. 21, 2006. copyright 2002-2006. 31-pgs.
Slim Devices. Inc. "Slim Devices: Squeezebox: Overview." obtained from http://www.slimdevices.com/pi_overview.html. generated Jun. 21, 2006. copyright 2002-2006. 3-pgs.
Slim Devices. Inc. "Slim Devices: Squeezebox: Free Your Music." obtained from http://www.slimdevices.com/index.html. generated Jun. 8, 2006. copyright 2002-2005. 2-pgs.
Slim Devices, Inc., "Squeezebox: Owner's Guide," copyright 2006, 32-pgs.
Slim Devices, Inc., "Squeezebox 2: Owners Guide," copyright 2005, 28-pgs.
Slim Devices, Inc., "Slim Devices: Squeezebox: Free Your Music.," obtained from http://www.slimdevices.com/index.html, generated Jun. 8, 2006, copyright 2002-2004, 1-pg.
Slim Devices, Inc., "Slim Devices: Squeezebos: Overview," http://www.slimdevices.com/pi_overview.html, generated Jun. 21, 2006, copyright 2002-2006, 3 pgs.
Slim Devices, Inc. "Slim Devices: Support: FAQ," obtained from http://www.slimdevices.com/su.sub.-faq.html, generated Jun. 21, 2006, copyright 2002-2005, 31 pgs.
Slim Devices, Inc. "Slim Devices: Squeezebox: Overview" obtained from http:www.slimdevices.com/pi.sub.--overview.html, generated Jun. 21, 2006, copyright 2002-0226, 3 pgs.
Skarlatos et al., "Sprite Backup 5.0", Internet Publication, Mar. 6, 2005 (downloaded www.pocketnow.com/index.php?a+portal print &t=review&id=788).
Sinitsyn, "A Synchronization Framework for Personal Mobil Servers," Proceedings of the Second IEEE Annual Conference on Pervasive Computing and communications Workshops, Piscataway, NJ, Mar. 14, 2004, pp. 1-4 5 pages retrieved from IEEE on Jul. 2011 (U.S. Appl. No. 11/519,429).
Shulzrinne et al., "Request for Comments: 3550," Network Working Group, Jul. 2003, 104-pgs.
Shulzrinne et al., "Request for Comments: 2326," Network Working Group, Apr. 1998, 92-pgs.
Schulzrinne Comumbia U A RAO Netscape R Lanphier RealNetworks H: "Real Time Streaming Protocol (RTSP)" IETF Standard, Internet Engineering Task Force, IETF, CH, Apr.
Rosenberg, J. et al., "SIP: Session Initiation Protocol", Jun. 1, 2002; 20020600, Jun. 1, 2001, Retrieved from ftp://frp-editor.org/in-notes/rfc3261.txt on Aug. 18, 2011, 232 pages.
Robbin et al., "SoundJam MP Plus Digital Audio System Version 2," Representative Screens, published by Cassady & Greene, Inc., Salinas, CA, 6 pgs, 2000.
Rio Portable Music Player, Web Review, downloaded Jan. 25, 2002, http://www.webreviews.com/9901/rio.html. (U.S. Appl. No. 11/519,429).

(56) References Cited

OTHER PUBLICATIONS

Replay Gain, "Replay Gain—A proposed Standard," Oct. 7, 2001 (downloaded from http://replaygain.hydrogenaudio.org/index.html and http://replaygain.hydrogenaudio.orgioutline.html).
Real Networks, Inc., "RealJukebox Plus Manual," pp. 1-83, 1999 (downloaded Oct. 27, 2005 http://www.real.com/Jukebox/release notes.html#).
RCA, "Lyra User's Guide," RD2201/2202/2204, www.lyrazone.com, pp. 1-37, 1999.
Pocket Tunes 5.0.0. copyright 2002-2009 Normsoft, Inc., (pp. 1-25, obtained from the Internet at: http://www.pocket-tunes.com/userguide/en.win)—[Downloaded 18 pages on Apr. 10, 2012 at http://www.pocket-tunes.com/userguide/en/) (U.S. Appl. No. 11/519,429).
Pocket PC Phone User Manual, High Tech Computer Corp., 2006; 208 pages, Downloaded Jul. 2011 www.htc.com (U.S. Appl. No. 11/519,429).
Personal Jukebox (PJB), "Systems Research Center and PAAD," Compaq Computer Corp., Oct. 13, 2000, http://research.compaq.com/SRC/pjb/. (U.S. Appl. No. 11/519,429).
Perkins, C., "RTP Audio and Video for the Internet, Chapter 5, RTP Control Protocol", 2003, Addison-Wesley, Boston, USA, pp. 95-111.
Perfect guide for digital/audio technique to enjoy music in PC, Nobuya Fukuda, published in "Nikkei Click", Japan, Nikkei business Publications, Inc., Sep. 8, 1999, vol. 6/No. 10, p. 169. (U.S. Appl. No. 11/519,429).
Palm, Inc., "Handbook for PalmTM m500 Series Handhelds, User Manual," 109 pgs.
Palacharla, S. et al., "Design and implementation of a Real-time Multimedia Presentation System using RTP", Computer Software and Applications Conference, COMPSAC '97, Aug. 1997, pp. 376-381.
Palacharla, et al. "Design and Implementation of a Real-time Multimedia Presentation System using RTP;" Computer Software and Applications Conference; Aug. 13, 1997; pp. 376-381.
Nutzel et al., "Sharing System for Future HiFi Systems", Proceedings of the Fourth International Conference on Web Delivering of Music, Sep. 13, 2004, 8 pgs. [9 pages downloaded] (U.S. Appl. No. 11/519,429).
Nullsoft, "winamp.com / Plug-ins," obtained from http://winamp.com/plugins/details.php?id=15667, generated Jun. 8, 2006, copyright 2006, 2 pgs.
NormSoft, Inc., "Pocket Tunes 5.0.0," 18 pgs, 2009 (http://www.pocket-tunes.com/userguide/en.win, downloaded 18 pages on Apr. 10, 2012 from http://www.pocket-tunes.com/userguide/enl).
Nomad Jukebox, User Guide, Creative Technology Ltd., Version 1, Aug. 2000. [38 pages downloaded Aug. 16, 2011] (U.S. Appl. No. 11/519,429).
Nilsson, "IDS tag versions 2.4.0.—Main Structure," 12 pgs, Nov. 1, 2000 (downloaded from http://www.id3.org/id3v2.4.0-structure?-action=print).
Nilsson, "ID3 tag version 2.3.0," 30 pgs, Feb. 3, 1999 (downloaded from http://www.id3.org/id3v2.3.0?action=print).
Myradus, LLC, "Myradus Media Player Puppeteer for iTunes," obtained from http://www.myradus.com/Product.sub.--MediaPlayerPuppeteerFrom.aspx, generated Jun. 8, 2006, copyright 2004-2005, 1 pg.
MusicMatch, "Musicmatch and Xing Technology Introduce Musicmatch Jukebox," May 18, 1998 (http://www.musicmatch.com/info/company/press/rel eases/?year +1998& release=2, downloaded Aug. 16, 2011 from http://www.thefreelibrary.com/MusicMatch+and+Xing+Technolo).
MusicMatch, "About MusicMatch Jukebox," MusicMatch Jukebox v4 Help, 4 pgs, 1999.
Miniman, "Applian Software's Replay Radio and Player v1.02," Product review, pocketnow.com, http://www.pocketnow.com/review/replay.htm, Jul. 31, 2001. Downloaded Aug. 25, 2011 http://web/archive.org/web/20010805081914/http://www.pocketnow.com/review- s/reply/reply.HTM (U.S. Appl. No. 11/519,429).
Mills, David L., "Request for Comments: 1305," Network Working Group, Mar. 1992, 113-pgs.

Microsoft Corp., "Window's Media Player 6.4," 2 pgs, 1999 (software downloadable at http://www.oldversion.com/program php?n=wmp, downloaded Jul. 13, 2011 from http://www.microsoft.com/download/en/confirmation.axps?displaylangen&id=2- 2758).
MediaGate, "Portable MPEG4 Player (MG-25)," 3 pgs, Jul. 29, 2004.
McGavren, "iTunes-perl," 2004-2006 (http://code.googlecom, 5 pgs (downloaded Jan. 13, 2012 from http://code.google.com/p/itunes-perl/wiki/ Usage).
Maulik, "Synchronizing mp3 playback, version #2," obtained from http://snarfed.org/exec/version?name=synchronizing+mp3+playback &version=2, generated Jun. 8, 2006, version #2 dated Dec. 28, 2004 in history, 2-pgs.
Maulik, "Synchronizing mp3 playback, version #1," obtained from http://snarfed.org/exec/version?name=synchronizing+mp3+playback &version=1-, generated Jun. 8, 2006, version #1 dated Nov. 8, 2004 in history, 2-pgs.
Maulik and Ryan. "Synchronizing mp3 playback. version #1" obtained from http://snarfed.org/exec/version?name=synchronizing+mp3+playback&version=3. generated Jun. 8, 2006. version #3 dated Jan. 2, 2005 in history. 3-pgs.
Maulik and Ryan, "Synchronizing mp3 playback, version #9," http://snarfed.org/exec/version?name=synchronizing+mp3+playback &version=9, generated Jun. 8, 2006, version #4 dated Mar. 3, 2005 in history, 3 pgs.
Maulik and Ryan, "Synchronizing mp3 playback, version #8," http://snarfed.org/exec/version?name=synchronizing+mp3+playback &version=8, generated Jun. 8, 2006, version #8 dated Feb. 23, 2005 in history, 3 pgs.
Maulik and Ryan, "Synchronizing mp3 playback, version #7," http://snarfed.org/exec/version?name=synchronizing+mp3+playback &version=7, generated Jun. 8, 2006, version #7 dated Feb. 21, 2005 in history, 3 pgs.
Maulik and Ryan, "Synchronizing mp3 playback, version #6," obtained from http://snarfed.org/exec/version?name=synchronizing+mp3+playback&version=6, generated Jun. 8, 2006, version #6 dated Feb. 2, 2005 in history, 3-pgs.
Maulik and Ryan, "Synchronizing mp3 playback, version #5," obtained from http://snarfed.org/exec/version?name=synchronizing+mp3+playback&version=5, generated Jun. 8, 2006, version #5 dated Jan. 19, 2005 in history, 3-pgs.
Maulik and Ryan, "Synchronizing mp3 playback, version #4," http://snarfed.org/exec/version?name=synchronizing+mp3+playback &version=4, generated Jun. 8, 2006, version #4 dated Jan. 3, 2005 in history, 3 pgs.
Maulik and Ryan, "Synchronizing mp3 playback, version #17," http://snarfed.org/exec/version?name=synchronizing+mp3+playback &version=17, generated Jun. 8, 2006, version #17 dated Feb. 5, 2006 in history, 4 pgs.
Maulik and Ryan "Synchronizing mp3 playback, version#7," obtainedfromhttp://snarfed.org/exec/Nersion?name-synchronizing+rp3hpiaybackuerllon7generated6/8/2006version#? datedFeb. 21, 2005nhistoy3pgs.
Linksys "New Linksys Wireless Home Products Showcased at CEBIT 2004" Internet Article (Mar. 18, 2004) www.broadbandbuyer.co.uk/Shop/pageTextDetail.asp?Setl0=2&Textl0=473.
Lindauer, "What's in Your Pocket?," Edgereview, 2 pgs (downloaded Jan. 25, 2002 from http://www.edgereview.com/print.cfm?Type+aag&ID=286).
K*Software, "kquery.com," obtained from http://www.kquery.com/index.php?page=software.sub.-info&subpage=1&id=8, generated Jun. 8, 2006, copyright 2004, 4-pgs.
iTunes-perl, copyright 2004-2006 by Jay McGavren, obtained from the Internet at http://code.googlecom, pp. 7. (downloaded 5 pages on Jan. 13, 2012 from http://code.google.com/p/itunes-perl/wiki/ Usage) (U.S. Appl. No. 11/519,429).
iTunes, Playlist Related Help Screens, iTunes v1.0, Apple Computer, Inc., Jan. 2001 (U.S. Appl. No. 11/519,429).
iTunes, Digital Music for your Mac, Apple Computer, Inc., downloaded Oct. 22, 2011, http://www.apple.com/itunes/ (U.S. Appl. No. 11/519,429).
iTunes 2, Playlist Related Help Screens, iTunes v2.0 Apple Computer, Inc., Oct. 23, 2001 (U.S. Appl. No. 11/519,429).

(56) References Cited

OTHER PUBLICATIONS

Iriver, "PMP140/120", Sep. 13, 2004, 1-2 pgs. (U.S. Appl. No. 11/519,429).
iPod +iTunes, Markt+Technik Verlag, 2007. (U.S. Appl. No. 11/519,429).
Interview Summary dated Nov. 1, 2010 for U.S. Appl. No. 11/306,557; 3 pages.
Interview Summary dated May 20, 2010 for U.S. Appl. No. 11/306,557; 3 pages.
Hughes, M., "Turning Streams Inside Out, Part 2: Optimizing internal Java 1/0", Sep. 3, 2002, 12 pages. Retrieved on Oct. 19, 2011 from http://50001.com/language/javaside/lec/javaibm/%BD%BA%%C6%AE%B8%B2%20% . . . .
Hewlett Packard, "Hewlett Packard Jornada 525 Color Pocket PC," (downloaded Jan. 25, 2002, http://www.pc4d.com/electronics/products/56/jornada 525 color pocket pc.shtml).
Hei et al., "iPod+iTunes," iTunes7, Markt+Technik Verlag, 54 pgs, Dec. 22, 2006 (German).
Harmony Central, "Diamond Multimedia Announces Rio PMP300 Portable MP3 Music Player", Press Release, 4 pgs, Sep. 14, 1998 (http://news.harmony-central.com/Newp/1988/Rio- Pump300.html, downloaded Aug. 16, 2011 from http://web.archive.org/web/20030705005208/http:/.
Handbook for Palm.TM. m500 Series Handhelds,User Manual.— (286 pages) (U.S. Appl. No. 11/519,429).
Glenn Fleishman, "Handheld iPod joins MP3 band a bit late, but is standout player," Nov. 6, 2001, http://seattletimes,nwsource.com/html/businesstechnology/134361811.sub.- ptmacc040.html. [Downloaded Jul. 21, 2011 from http://web.archive.org/...001110233639/http://seattletimes.nwsource.com/h-tml/businesstechnology/134361811.sub.--ptmacc040.html] (U.S. Appl. No. 11/519,429).
Fukuda, "Perfect Guide for Digital/Auio Technique to Enjoy Music in PC," Nikkei Click, Japan, Nikkei Business Publications, Inc., vol. 6, No. 10, 1 pg, Sep. 8, 1999 (not attached herewith; a copy will be submitted with next IDS filing).

Firewire, IEEE 1394 (also known as Sony's iLink), (http://www.wikipedia.org/wiki/Firewire (1995)). Download Jul. 13, 2011—http://en.wikipedia.org/wiki/IEEE.sub.--1393.sub.-interface (U.S. Appl. No. 11/519,429).
Etchison, "Accelerated discrete Adjustment of the Parameters of a Process", IBM Technical Disclosure Bulletin, vol. 15, No. 5, Oct. 1, 1972, 2 pgs. (U.S. Appl. No. 11/519,429).
Escient, Inc., "TuneBase Pro Mk-II User's Guide," 1999 (downloaded Jul. 25, 2011) (not attached herewith; A copy will be submitted with next IDS filing).
Erdmann et al., "iPod+iTunes," O'Reilly, 157 pgs, 2006 (German).
Engst, "SoundJam Keeps on Jammin'," Jun. 19, 2000, (http://db.tidbits.com/getbits.acgi? tbart=05988, downloaded Jul. 25, 2011 from http?..db.tidbits.com/article/5988?print version+1).
Digital Still Cameras—Downloading Images to a Computer, Mimi Chakarova et al., Multi-Media Reporting and Convergence, 2 pgs. (U.S. Appl. No. 11/519,429).
Diamond Multimedia Announces Rio PMP300 Portable MP3 Music Player, Press Release, http://news.harmony-central.com/Newp/1988/Rio-Pump300.html, Sep. 14, 1998, 4 pgs. Downloaded on Aug. 16, 2011—http://www.archive.org/web/20030705005208/http://news.harmony-centr-al.com/Newp/1998/Rio-PMP300/html (U.S. Appl. No. 11/519,429).
De Herrera, Chris, "Microsoft ActiveSync 3.1" Version 1.02, (Oct. 13, 2000 Downloaded Aug. 16, 2011 From http://www.pocketpcfaq.com/wce/activesync3.1.htm (U.S. Appl. No. 11/519,429).
D-Link's New Wireless Media Device Plays Digital Music, Videos, and Photos on Home Television and Stereo; Retrieved from URL:http://presslink.dlink.com/pr/?prid=136, dated Jan. 20, 2004; 2-pgs.
Compaq Computer Corp., copyright 1991, Personal Jukebox User Manual, pp. 1-29. (U.S. Appl. No. 11/519,429).
Compaq Computer Corp., "Systems Research Center and PAAD," Personal Jukebox (PJB), 25 pgs, Oct. 13, 2000 (downloaded from http://research.compaq.com/SRC/pjb/; redownloaded Apr. 2016 from http://birrell.org/andrew/talks/pjb-overview.pdf).
Stenton, Stuart P., Richard Hull, Patrick M. Goddi, Josephine E. Reid, Ben JC Clayton, Tom J. Melamed, and Susie Wee. "Mediascapes: Context-aware multimedia experiences." IEEE Multi Media 14, No. 3 (2007): 98-105. (Year: 2007).

\* cited by examiner

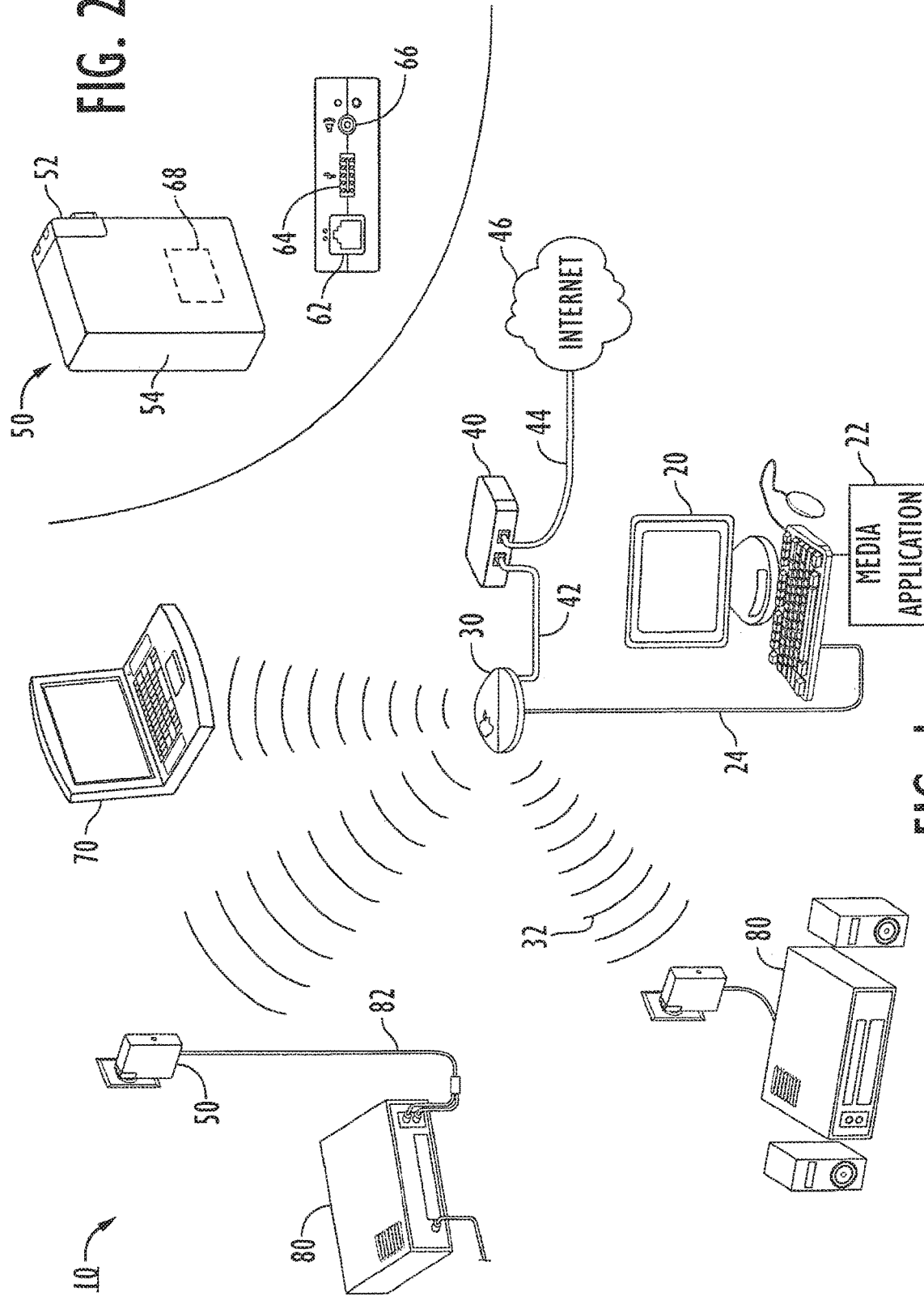

FIG. 6A 370

```
                  RTCP RETRANSMIT REQUEST PACKET
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
HEADER |V=2|P|     0     |     PT=213    |            LENGTH           | +0/0X00
   +-+-+-+-+-+-+-+-+-+-+-+-+-+-+-+-+-+-+-+-+-+-+-+-+-+-+-+-+-+-+-+-+
RETRANSMIT |    SEQUENCE NUMBER BASE    |   SEQUENCE NUMBER COUNT    | +4/0X04
INFORMATION +-+-+-+-+-+-+-+-+-+-+-+-+-+-+-+-+-+-+-+-+-+-+-+-+-+-+-+-+-+-+-+-+ +8/0X08
```

FIG. 6B 380

```
                  RTCP RETRANSMIT RESPONSE PACKET
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
HEADER |V=2|P|     0     |     PT=214    |            LENGTH           | +0/0X00
   +-+-+-+-+-+-+-+-+-+-+-+-+-+-+-+-+-+-+-+-+-+-+-+-+-+-+-+-+-+-+-+-+
RETRANSMIT |                                                          | +4/0X0C
INFORMATION |                          PAYLOAD                        |
           +-+-+-+-+-+-+-+-+-+-+-+-+-+-+-+-+-+-+-+-+-+-+-+-+-+-+-+-+-+-+-+-+ +1444/0X5A4
```

FIG. 6C 390

```
               RTCP FUTILE RETRANSMIT RESPONSE PACKET
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
HEADER |V=2|P|     0     |     PT=214    |            LENGTH           | +0/0X00
   +-+-+-+-+-+-+-+-+-+-+-+-+-+-+-+-+-+-+-+-+-+-+-+-+-+-+-+-+-+-+-+-+
RETRANSMIT |    SEQUENCE NUMBER BASE    |             PAD             | +4/0X0C
INFORMATION +-+-+-+-+-+-+-+-+-+-+-+-+-+-+-+-+-+-+-+-+-+-+-+-+-+-+-+-+-+-+-+-+ +1444/0X5A4
```

SYSTEM AND METHOD FOR SYNCHRONIZING MEDIA PRESENTATION AT MULTIPLE RECIPIENTS

INCORPORATION BY REFERENCE; DISCLAIMER

Each of the following applications are hereby incorporated by reference: application Ser. No. 15/659,603, filed on Jul. 25, 2017; application Ser. No. 14/167,742, filed Jan. 29, 2014; application Ser. No. 11/696,679, filed on Apr. 4, 2007; application Ser. No. 11/306,557, filed Jan. 2, 2006; application Ser. No. 10/862,115, filed Jun. 4, 2004. The Applicant hereby rescinds any disclaimer of claim scope in the parent applications or the prosecution history thereof and advises the USPTO that the claims in this application may be broader than any claim in the parent applications.

FIELD OF THE DISCLOSURE

The subject matter of the present disclosure relates to a system and method for synchronizing presentation of media at multiple recipients or devices on a network.

BACKGROUND OF THE DISCLOSURE

With the increasing capacity and capability of personal computers, as well as improved multimedia interfaces for these computers, it has become popular to use personal computers as a repository for multimedia content, such as songs, movies, etc. Particularly with music, the increased popularity of storing multimedia information on a personal computer has resulted in a variety of products and services to serve this industry. For example, a variety of stand-alone players of encoded multimedia information have been developed, including, for example, the iPod, produced by Apple Computer of Cupertino, Calif. Additionally, services have been developed around these devices, which allow consumers to purchase music and other multimedia information in digital form suitable for storage and playback using personal computers, including, for example, the iTunes music service, also run by Apple Computer.

These products and services have resulted in an environment where many consumers use their personal computer as a primary vehicle for obtaining, storing, and accessing multimedia information. One drawback to such a system is that although the quality of multimedia playback systems for computers. e.g., displays, speakers, etc. have improved dramatically in the last several years, these systems still lag behind typical entertainment devices, e.g., stereos, televisions, projection systems, etc. in terms of performance, fidelity, and usability for the typical consumer.

Thus, it would be beneficial to provide a mechanism whereby a consumer could easily obtain, store, and access multimedia content using a personal computer, while also being able to listen, view, or otherwise access this content using conventional entertainment devices, such as stereo equipment, televisions, home theatre systems, etc. Because of the increasing use of personal computers and related peripherals in the home, it would also be advantageous to integrate such a mechanism with a home networking to provide an integrated electronic environment for the consumer.

In addition to these needs, there is also increasing interest in the field of home networking, which involves allowing disparate devices in the home or workplace to recognize each other and exchange data, perhaps under the control of some central hub. To date a number of solutions in this area have involved closed systems that required the purchase of disparate components from the same vendor. For example, audio speaker systems that allow computer-controlled switching of music from one location to another may be purchased as a system from a single vendor, but they may be expensive and/or may limit the consumer's ability to mix and match components of a home network from different vendors according to her own preferences. Thus, it would be beneficial to provide a mechanism by which various home networking components from differing vendors can nonetheless interact in a home network environment.

The subject matter of the present disclosure is directed to overcoming, or at least reducing the effects of, one or more of the problems set forth above.

SUMMARY OF THE DISCLOSURE

A system and method for delivering network media at multiple devices is disclosed. For example, the network media delivery system includes client devices and a host device. Each client device has a network interface for network communication, an engine for processing media data, and a media interface for delivering processed media. The host device, which can be a computer, establishes network communication links with the client devices, which can be networked media stations. The media data can be audio, video, or multimedia. In one embodiment, the network communication links are wireless links established between a wireless network interface on the host device and wireless network interfaces on the client devices.

The host device sends media data to the client devices via the network. The media data can be sent wirelessly as unicast streams of packets containing media data that are transmitted at intervals to each client device, in one embodiment, the host device controls processing of media data such that processed media is delivered in a synchronized manner at each of the client devices. In another embodiment, the host device controls processing of media data such that processed media is delivered in a synchronized manner at the host device and at least one client device.

The system uses Network Time Protocol (NTP) to initially synchronize local clocks at the client devices with a reference clock at the host device. The media data is preferably sent as Real-Time Transport Protocol (RTP) packets from the host device to the client device. The system includes mechanisms for periodic synchronization, stretching, and compressing of time at the local clocks to handle clock drift. In addition, the system includes mechanisms for retransmission of lost packets of media data. In one embodiment, the system can be used to deliver audio at multiple sets of speakers in an environment, such as a house, and can reduce effects of presenting the audio out of sync at the multiple sets of speakers to avoid user-perceivable echo.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which:

FIG. 1 illustrates an embodiment of a network media delivery system according to certain teachings of the present disclosure.

FIG. 2 illustrates an embodiment of a networked media station or client device.

FIG. 6A illustrates an embodiment of a packet requesting retransmission of lost packets.

FIG. 6B illustrates an embodiment of a response to retransmission request.

FIG. 6C illustrates an embodiment of a response to a futile retransmission request.

Figure 3A:
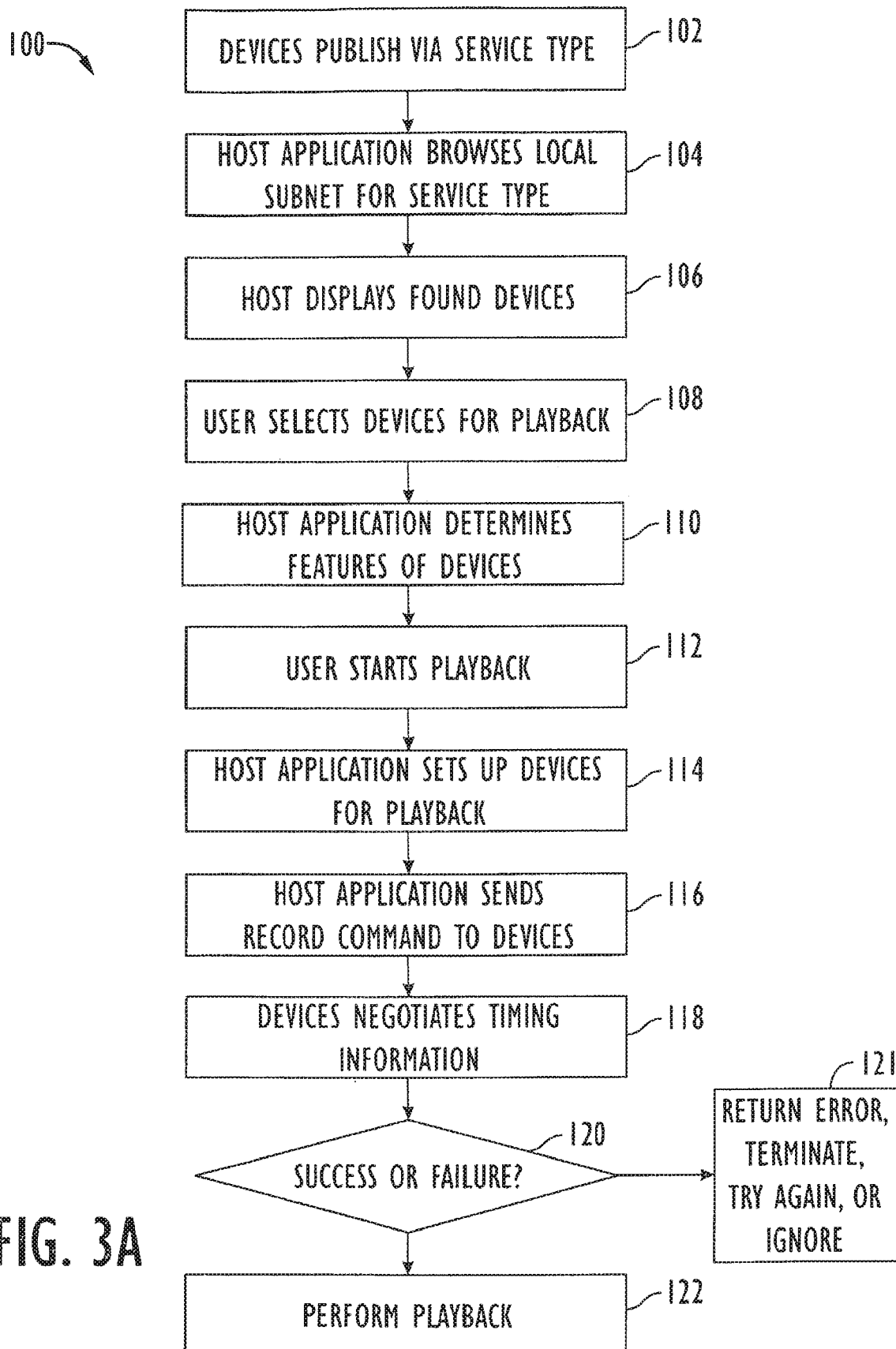
FIG. 3A illustrates a process of operating the disclosed system to playback audio data at selected playback devices in flowchart form.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. § 112.

DETAILED DESCRIPTION

A network media delivery system having a host device and multiple client devices is described herein. The following embodiments disclosed herein are described in terms of devices and applications compatible with computer systems manufactured by Apple Computer. Inc. of Cupertino, Calif. The following embodiments are illustrative only and should not be considered limiting in any respect.

I. Components of the Network Media Delivery System

Referring to FIG. 1, an embodiment of a network media delivery system 10 according to certain teachings of the present disclosure is illustrated. The system 10 includes a host device or computer system 20 and one or more networked media stations or client devices 50, and various other devices. The system 10 in the present embodiment represents only one of several possible configurations and is meant to be illustrative only. Other possible configurations are discussed in the incorporated U.S. patent application Ser. No. 10/862,115. For example, the host device 20 can have a wired or wireless connection to each of the client devices 50 without the use of a hub or base station 30, or the host device 20 can have a wireless connection to the hub or base station 30. The system 10 is used to distribute media (e.g., audio, video, multimedia, etc.) via network connections from the host device 20 to multiple client devices 50 located throughout an environment, such as a house, office, etc.

The host device 20 is a personal computer, such as an AirPort-equipped Mac or a Wi-Fi-compliant Windows-based PC. The client devices 50 are networked media stations, such as disclosed in incorporated U.S. patent application Ser. No. 10/862,115. The client devices 50 are plugged into wall sockets, which provide power to the client devices 50, and are coupled to entertainment devices, such as amplifiers 80, powered speakers, televisions, stereo systems, videocassette recorders, DVD players, home theatre systems, or other devices capable of delivering media known in the art.

An example of the client device 50 is discussed briefly with reference to FIG. 2. The client device 50 includes an AC power adapter portion 52 and a network electronics portion 54. The network electronics portion 54 includes a wired network interface 62, a peripheral interface 64, and a media interface 66. As illustrated, the wired network interface 62 is an Ethernet interface, although other types of wired network interface known in the art could be provided. Similarly, the peripheral interface 64 is illustrated as a USB interface, although other types of peripheral interfaces, such as IEEE 1394 ("Firewire"), RS-232 (serial interface). IEEE 1284 (parallel interface), could also be used. Likewise, the media interface 66 is illustrated as an audio interface including both an analog lineout and an optical digital audio functionality. However, other media interfaces known in the art, such as a multimedia interface or a video interface using composite video, S-video, component video, Digital Video Interface (DVI). High Definition Multimedia Interface (HDMI), etc., could also be provided.

The network electronics portion 54 also includes a wireless networking interface 68. The wireless network interface 68 preferably takes the form of a "Wi-Fi" interface according to the IEEE 802.11b or 802.11g standards know in the art. However, other wireless network standards could also be used, either in alternative to the identified standards or in addition to the identified standards. These other network standards can include the IEEE 802.11a standard or the Bluetooth standard, for example.

Returning to FIG. 1, the host device 20 runs a media application 22. In one exemplary embodiment, the media application 22 is iTunes software for media file management and playback produced by Apple Computer, Inc. In the present configuration, which is only one of several possibilities, the host device 20 is equipped with an Ethernet port that is connected via a cable 24 to a base station 30. The base station 30 can be any variety of access points known in the art. Preferably, the base station 30 includes wireless access, routing, switching and firewall functionality. The base station 30 is connected via a cable 42 to a modem 40, which receives an Internet connection through a connection 44. Using this arrangement, multimedia files stored on host device 20 can be played using stereo amplifiers 80, which are connected to client devices 50 using one of the audio interfaces on the client devices 50. The host device 20 and the client devices 50 preferably communicate via a wireless network segment (illustrated schematically by connections 32), but wired network segments formed by wired connections, such as Ethernet cables, could also provide communication between the host device and the client devices 50. The client devices 50 communicate with the entertainment devices via a wired network segment 82.

The client devices 50 act as wireless base stations for a wireless network and enable the host device 20 to deliver media (e.g., audio, video, and multimedia content) at multiple locations in an environment. For example, the client devices 50 are connected to stereo amplifiers 80 or other entertainment devices to playback media stored on the host device 20. In one embodiment, a line level audio or a digital fiber optic type of connector connects the client devices 50 to the stereo amplifiers 80. Either type of connector can plug into the multimedia port (66; FIG. 2), which is a dual-purpose analog/optical digital audio mini-jack. To interface with stereo amplifiers 80, a mini stereo to RCA adapter cable 82 is used, which connects to RCA-type right and left audio input ports on the stereo amplifier 80. Alternatively, a Toslink digital fiber optic cable can be used, which would connect to digital audio input port on the stereo amplifiers 80. These and other configurations are disclosed in incorporated U.S. patent application Ser. No. 10/862,115.

For the purposes of the present disclosure, the client devices 50 can also be connected to laptops 70 or personal computers that are capable of playing media (audio, video, etc.) so that the laptops and personal computers can also be considered entertainment devices. Moreover, the laptops 70 or personal computers can have the same functionality as both a client device 50 and an entertainment device so that the laptops 70 and personal computers can be considered both a client device and an entertainment device. Accordingly, the term "client device" as used herein is meant to encompass not only the networked media stations associated with reference numeral 50, but the term "client device" as used herein is also intended to encompass any device (e.g., laptop, personal computer, etc.) compatible with the network media delivery system 10 according to the present disclosure. In the present disclosure, however, reference is made to client devices 50 for ease in discussion. Furthermore, the term "entertainment device" as used herein is meant to encompass not only stereo amplifiers 80 as shown in FIG. 1, but the term "entertainment device" as used herein is also intended to encompass powered speakers, televisions, stereo systems, videocassette recorders, a DVD players, home theatre systems, laptops, personal computers, and other devices known in the art that capable of delivering media.

The client devices 50 receive media data from the host device 20 over network connections and output this media data to the entertainment devices. Although it is contemplated that audio, video, audio/video, and/or other forms of multimedia may be used, exemplary embodiments disclosed herein relate to sharing of audio with client devices 50 connected to entertainment devices, such as stereo amplifiers 80, or with laptops 70 or other computers having internal speakers or the like. The audio can stored on the host device 20 or can be obtained from the Internet 46. However, it will be appreciated that the teachings of the present disclosure can be applied to video, audio/video, and/or other forms of multimedia in addition to the audio in the exemplary embodiments disclosed herein. Furthermore, in the discussion that follows, various details of the network media delivery system are implemented using hardware and software developed by Apple Computer. Inc. Although certain details are somewhat specific to such an implementation, various principles described are also generally applicable to other forms of hardware and/or software.

During operation, the system 10 delivers the same audio in separate locations of an environment (e.g., multiple rooms of a home). The system 10 addresses several issues related to playing the same audio in multiple, separate locations. One issue involves playing the audio in the separate locations in a synchronized manner with each other. Because the host device 20 and the client devices 50 have their own processors, memory, and transmission interfaces, sending or streaming audio from the host device 20 to the client devices 50 through a wireless or wired communication link will not likely result in synchronized playing of the audio at the separate locations. In addition, the client device 50 may be connected to different types of entertainment devices, which may have different latency and playback characteristics. It is undesirable to play the same audio in the separate locations out of sync because the listener will hear echoes and other undesirable audio effects. The system 10 addresses this issue by substantially synchronizing the playing of the audio in each location so that echo and other effects can be avoided. It should be noted that the level of precision required to substantially synchronize the playing of media at each location depends on the type of media being played, the perceptions of the user, spatial factors, and other details specific to an implementation.

Another issue related to playing of the same audio involves how to handle lost audio data at the separate locations. To address this issue, the disclosed system 10 preferably uses a retransmission scheme to recover lost audio. These and other issues and additional details of the disclosed network media delivery system are discussed below.

II. Process of Operating the System

Referring to FIG. 3A, a process 100 of operating the network media delivery system of the present disclosure is illustrated in flowchart form. During discussion of the process 100, reference is concurrently made to components of FIG. 1 to aid understanding. As an initial step in the process 100, network discovery is performed, and the networked client devices 50 and other configured devices (e.g., a configured laptop 70) publish or announce their presence on the network using a predefined service type of a transfer control protocol (Block 102). The host device 20 browses the local sub-net for the designated service type (Block 104).

The network discovery is used to initiate the interface between the host device 20 and client devices 50 and other compatible devices over the network of the system 10. One example of such a network discovery uses Bonjour, which is a technology that enables automatic discovery of computers, devices, and services on IP networks. Bonjour uses standard IP protocols to allow devices to find each other automatically without the need for a user to enter IP addresses or configure DNS servers. Various aspects of Bonjour are generally known to those skilled in the art, and are disclosed in the technology brief entitled "MAC OS X: Bonjour," dated April 2005, and published by Apple Computer, which is incorporated herein by reference in its entirety. To provide the media sharing functionality between the host device 20 and the client devices 50, the client devices 50 advertise over the network that they support audio streaming and particular audio capabilities (e.g., 44.1 kHz sample rate, 16-bit sample size, and 2-channel/stereo samples). The client devices 50 may also advertise security, encryption, compression, and other capabilities and/or parameters that are necessary for communicating with the client devices 50.

When complaint client devices 50 are discovered, the addresses and port numbers of the discovered devices 50 are stored for use by the system 10. Then, the media application 22 displays information about the found client devices 50 in a user interface operating on the host device 20 (Block 106). In one embodiment, for example, the media application 22 discovers the client devices by obtaining information of the user's step up of computers and networks for their house, office, or the like from another application containing such information. In another embodiment, for example, the media application 22 discovers the client devices 50 and recognizes these client devices 50 as potential destinations for audio data. Then, the media application 22 automatically provides these recognized devices 50 as part of a selectable destination for audio playback in a user interface.

Figure 4:
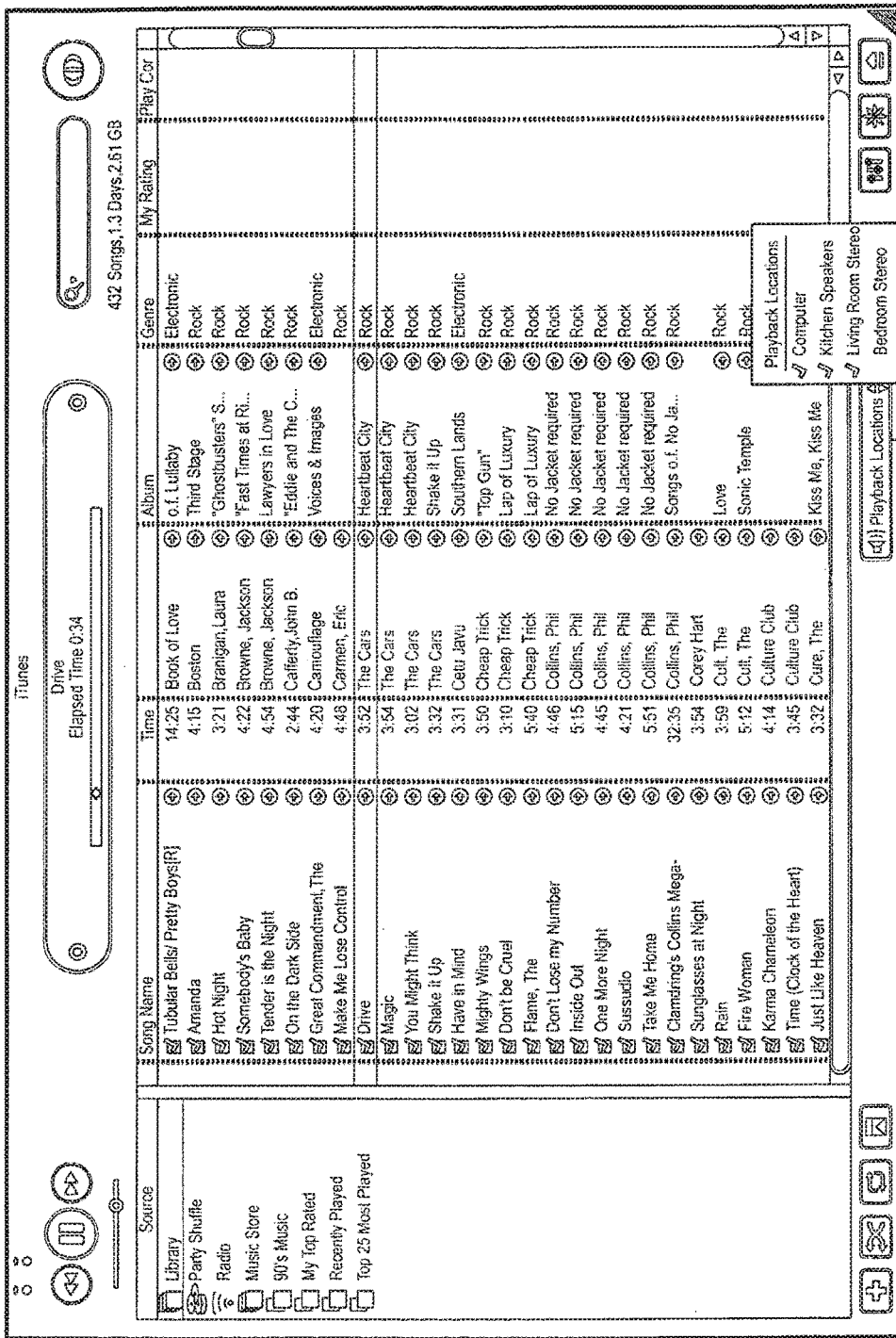
FIG. 4 illustrates an embodiment of an interface of a media application operating on a host device of the disclosed system.

FIG. 4 shows an example of a user interface 200 associated with the media application, such as iTunes. Among other elements, the user interface 200 shows an icon 202 for selecting playback locations (e.g., networked client devices and other playback devices located in a house), which have detected on the network. A user may select the icon 202 to access a pop-up menu 204 in which the user can activate/deactivate (i.e., check or uncheck) one or more of the playback locations as destinations for audio playback. Of course, the user interface 200 can display possible destinations for audio playback in a number of ways. For example, the display of possible destination can include a network schematic of the user's dwelling, office, or the like, that shows possible destination, or the display can be customized by the user.

Returning to FIG. 3A, the user selects one or more of the client devices to be used for playback in the user interface (Block 108). The host device 20 then uses Real-Time Streaming Protocol (RTSP) to set up and control the audio stream, and the host device 20 initiates an RTSP connection to each of the selected client devices 50 to determine which set of features the devices 50 support and to authenticate the user (if a password is required) (Block 110). On the host device 20, the user can then start playback using the user interface of the media application 22 (Block 112). The host device 20 makes an RTSP connection to each client device 50 to set it up for playback and to start sending the audio stream (Block 114). The host device 20 then sends a command to each client device 50 to initiate playback (Block 116). When each client device 50 receives the command, the device 50 negotiates timing information via User Datagram Protocol (UDP) packet exchanges with the host device 20 (Block 118). Each client device 50 then determines whether the timing negotiation either succeeds or fails (Block 119). The client devices 50 do not respond to the command to initiate playback until the timing negotiation either succeeds or fails. The timing negotiation occurs early to guarantee that the client devices 50 have the initial timing information needed to synchronize their clocks with the host device 20 before any audio packets are processed by the client devices 50.

If the negotiation succeeds, the client device 50 can be used for playback (Block 120). If the negotiation fails, however, the associated client device 50 can perform a number of possible operations (Block 121). For example, the client device 50 can return an error to the host device 20 in response to the command, and the session on this device 50 can be terminated. In another possible operation, the associated client device 50 can retry to negotiate the timing information. Alternatively, the associated client device 50 can ignore the fact that negotiating timing information has failed. This may be suitable when the user is not interested in the audio playing in synchronized manner in the multiple locations associated with the client devices 50. For example, the client device may be located by the pool or out in the garage and does not necessarily need to deliver the audio in synch with the other devices.

Figure 3B:
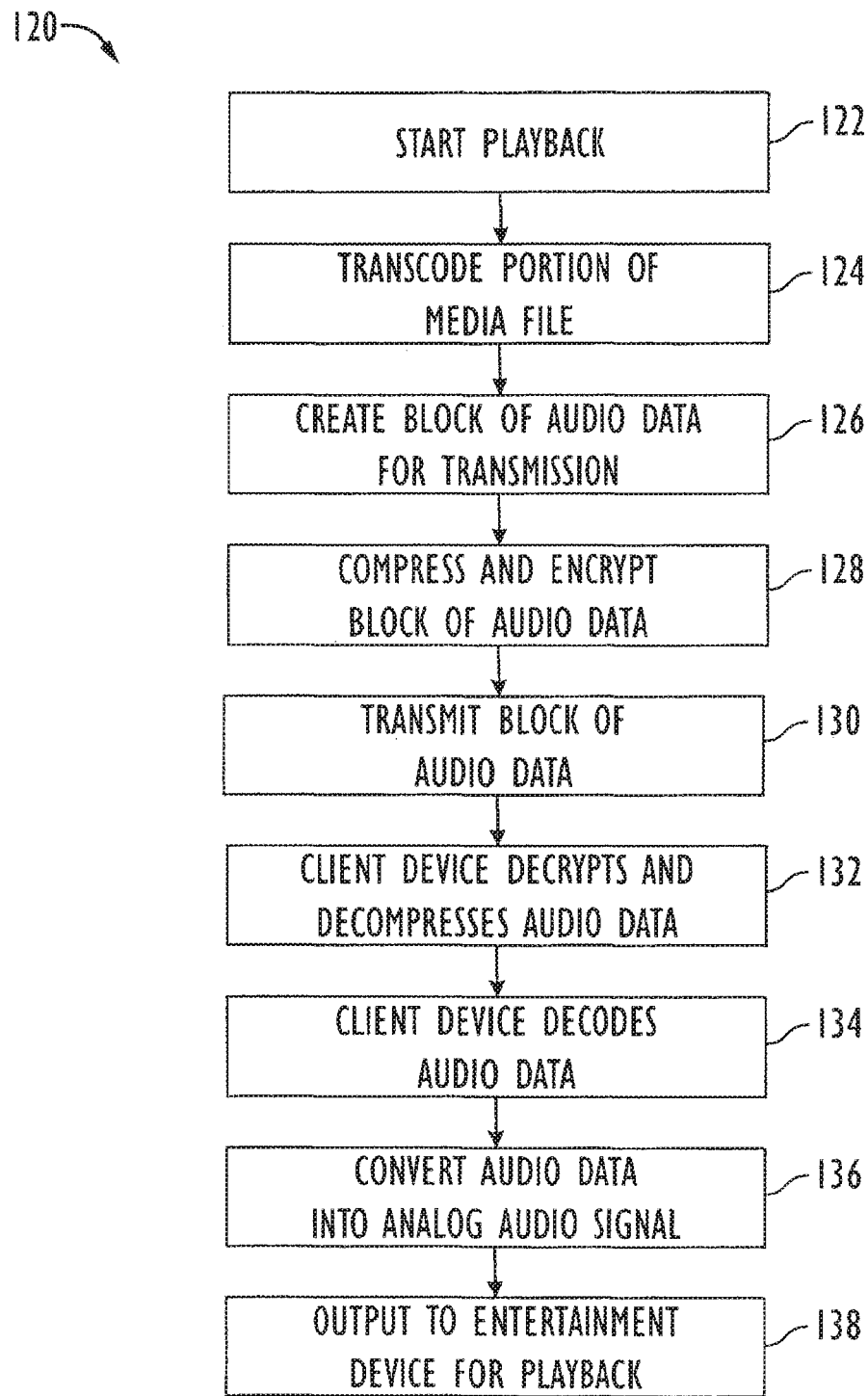
FIG. 3B illustrates a process of operating the disclosed system to transmit audio data to client devices in flowchart form.

During playback at Block 120, the host device 20 sends audio data to the client devices 50, which process the audio data and deliver processed audio to the connected entertainment devices. An example of the process of playing back audio is discussed below with reference to the flowchart of FIG. 3B with concurrent reference to element numerals of FIG. 1. Various buffering, error checking, and other data transfer steps have been omitted from the general description of FIG. 3B.

As discussed above, the host device 20 is connected to a wireless network established by the access point 30, which can also provide for a shared connection to the Internet or other network 46. The client devices 50 are also connected to the wireless network and have their multimedia ports connected to stereo amplifiers 80 or other entertainment device having output speakers or other multimedia output capability. A digital media file (e.g., a song in ACC format) is stored on the host device 20. Once playback is started (Block 122), the host device 20 transcodes a portion of the media file from the format (e.g., AAC) in which it is stored to a format that is understood by client device 50 (Block 124). This transcoding step is not necessarily required if the file is stored on the host device 20 in a format that is understood by the client device 50. In any case, a block of audio data for transmission is created (Block 126). This audio data is preferably compressed and encrypted (Block 128). Encryption is not necessarily required, but it is advantageous for digital rights management purposes.

The host device 20 then transmits the audio data over the wireless network to the client devices 50 (Block 130). The client devices 50 decrypt and decompress the received audio data (Block 132), and the client devices 50 decode the audio data based on the encoding performed in Block 124 (Block 134). The decoding results in raw audio data, which may be, for example, in the form of PCM data. This data is converted to analog audio signals by digital-to-audio converters (DAC) (Block 136), and the audio signals are output to the stereo amplifiers 80 for playing with their loudspeakers (Block 138).

With the benefit of the description of the components of the disclosed network media delivery system and its process of operation provided in FIGS. 1 through 4, the discussion now turns to details related to how data is transferred between the host device and client devices, how lost data is handled, and how playback is synchronized, in addition to other details disclosed herein.

III. Network Transport Used for the System

To transfer audio data and other information, the network media delivery system 10 of the present disclosure preferably uses User Datagram Protocol (UDP) as its underlying transport for media data. UDP is beneficial for synchronized playback to the multiple client devices 50 because synchronized playback places time constraints on the network protocol. Because audio is extremely time sensitive and has a definite lifetime of usefulness, for example, a packet of media data, such as audio, can become useless if it is received after a point in time when it should have been presented. Accordingly, UDP is preferred because it provides more flexibility with respect to the time sensitive nature of audio data and other media data.

To use UDP or some similar protocol, the disclosed system is preferably configured to handle at least a small percentage of lost packets. The lost packets can be recovered using Forward Error Correction (FEC), can be hidden using loss concealment techniques (e.g. repetition, waveform substitution, etc.), or can be recovered via retransmission techniques, such as those disclosed herein. Although UDP is preferred for the reasons set forth herein, Transmission Control Protocol (TCP) can be used. Depending on the implementation, retransmission using TCP may need to address problems with blocking of transmissions. If a TCP segment is lost and a subsequent TCP segment arrives out of order, for example, it is possible that the subsequent segment is held off until the first segment is retransmitted and arrives at the receiver. This can result in a chain reaction and effective audio loss because data that has arrived successfully and in time for playback may not be delivered until it is too late. Due to some of the retransmission difficulties associated with TCP, the Partial Reliability extension of Stream Control Transmission Protocol (SCTP) can provide the retransmission functionality. Details related to the Partial Reliability of SCTP are disclosed in RFC 3758, which can be obtained from http://www.ietf.org/rfc/rfc3758.txt, which is incorporated herein by reference.

UDP is preferred for time critical portions of the protocol because it can avoid some of the problems associated with blockage of transmission. For example, UDP allows the host's media application 22 to control retransmission of lost data because the media application 22 can track time constraints associated with pieces of audio data to be delivered. Based on the known time constraints, the media application 22 can then decide whether retransmission of lost packets of audio data would be beneficial or futile. All the same, in other embodiments, time critical portions of the disclosed system, such as time syncing, can be implemented using UDP, and audio data delivery can use TCP with a buffering system that addresses blocking problems associated with TCP.

IV. Audio Streaming and Playback with System

Figure 5A:
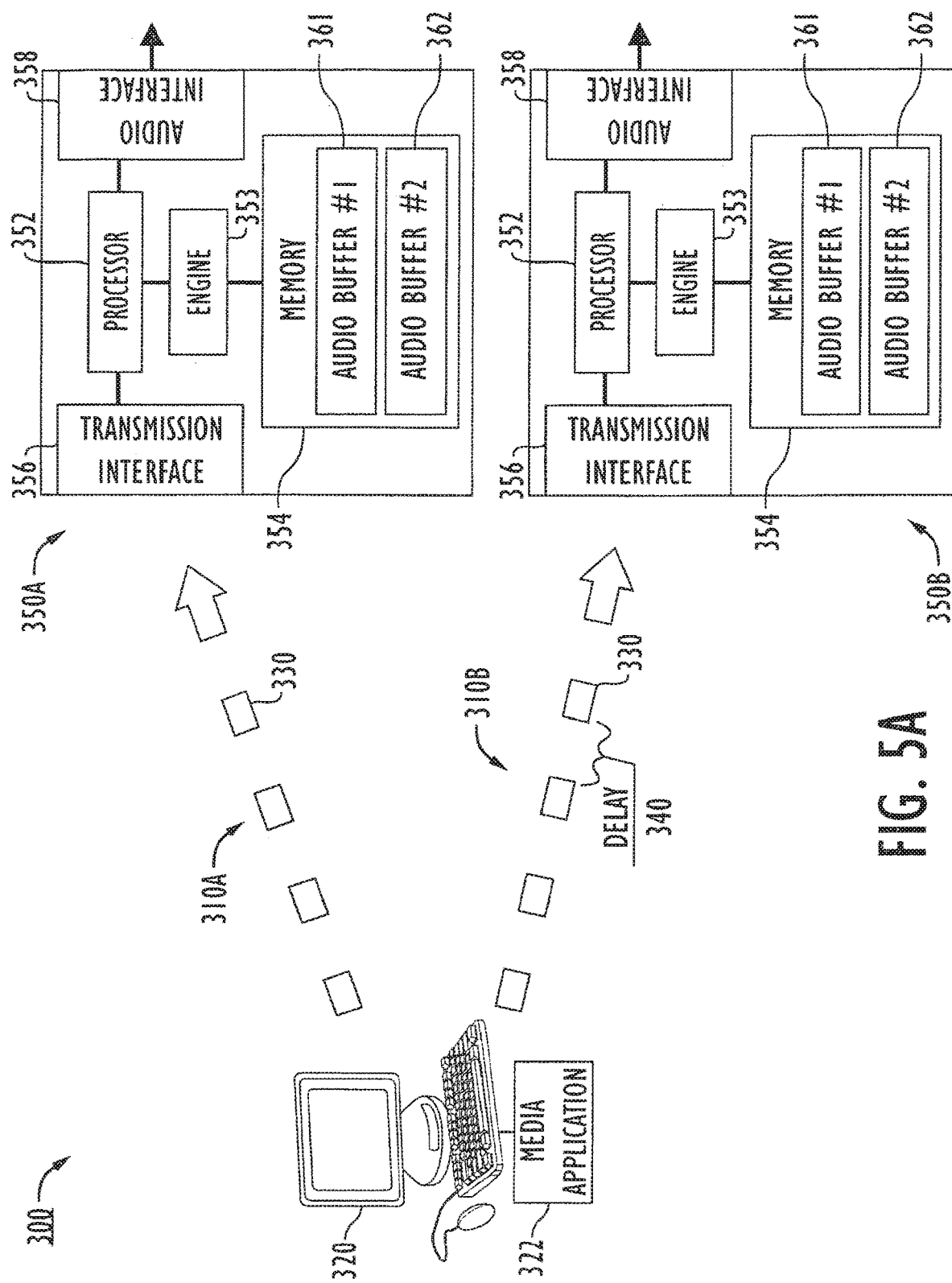
FIG. 5A illustrates portion of the disclosed system having a host device delivering packets to multiple client devices.

Before discussing how the client devices negotiate timing information in order to play audio in synchronization, the discussion first addresses how the disclosed system streams audio for playback. Referring to FIG. 5A, a portion of the disclosed system 300 is shown with a host device 320 and at least two client devices 350A-B. Each of the client devices 350 has a processor 352, a memory 354, a transmission interface 356, and an audio interface 358. The client devices 350 also include a UDP stack and can include a TCP stack depending on the implementation. As noted previously with reference to the client device of FIG. 2, the transmission interfaces 356 can be a Wi-Fi-compatible wireless network interface, and the audio interface 358 can provide an analog and/or an optical digital output. The processor 352 and memory 354 can be conventional hardware components known in the art. The memory 354 has two audio buffers 361 and 362.

Although not shown in FIG. 5A, each of the client devices 350 has a local clock, a playback engine, and other features.

The host device 320 uses several commands to set up a connection with and to control operation of the client devices 350. These commands include ANNOUNCE (used for identification of active client devices), SETUP (used to setup connection and operation). RECORD (used to initiate playback at client devices). PAUSE (used to pause playback). FLUSH (used to flush memory at the client devices), TEARDOWN (used to stop playback), OPTIONS (used to configure options). GET_PARAMETER (used to get parameters from the client devices), and SET_PARAMETER (used to set parameters at the client devices).

Preferably, the client devices 350 are authenticated when initially establishing a connection to the media application 322 running on the host device 320. Upon successful authentication, the media application 322 opens network connections to the transmission interface 356 of the client devices 350. Preferably, network connections between the host device 320 and the client devices 350 are separated into an audio channel for sending audio data and a control channel, used to set up connection and operation between the devices 320 and 350. However, a single channel could be used for data and control information. Once the connections are established, the host device 320 begins sending data to the client devices 350. In turn, the client devices 350 receive the audio data, buffer some portion of the data, and begin playing back the audio data once the buffer has reached a predetermined capacity.

Communication between the host device 320 and the client devices 350 preferably uses the Real Time Streaming Protocol (RTSP) standard. The media application 322 at the host device 320 preferably uses Real-Time Transport Protocol (RTP) encapsulated in User Datagram Protocol (UDP) packets 330 to deliver audio data from the host device 320 to the client devices 350. RTSP, RTP, and UDP are standards known to those skilled in the art. Therefore, some implementation details are not discussed here. Details of RTSP can be found in "Real-Time Streaming Protocol." RFC 2326, which is available from http://www.ietf.org/rfc/ifc2326.txt and which is hereby incorporated by reference in its entirety. Details of RTP can be found in "Real-Time Transport Protocol." RFC 3550, which is available from http://www.ietf.org/rfc/rfc3550.txt and which is hereby incorporated by reference in its entirety.

The packets 330 have RTP headers and include both sequence numbers and timestamps. The data payload of the RTP packets 330 contains the audio data to be played back by the client devices 350. The media files, from which the packets 330 are derived, can be stored on host device 320 in one or more formats, including, for example, MP3 (Motion Picture Expert's Group Layer 3), AAC (Advanced Audio Coding a/k/a MPEG-4 audio), WMA (Windows Media Audio), etc. Preferably, the media application 322 running on the host device 320 decodes these various audio formats to construct the packets 330 so that the client devices 350 do not need decoders for multiple formats. This also reduces the hardware performance requirements of the client devices 350. Another advantage of performing decoding on the host device 320 is that various effects may be applied to the audio stream, for example, cross fading between tracks, volume control, equalization, and/or other audio effects. Many of these effects would be difficult or impossible to apply if the client device 350 were to apply them, for example, because of the computational resources required. Although not preferred in the present embodiment, other embodiments of the present disclosure can allow for decoding at the client devices 350 for audio and other forms of media.

The host device 320 preferably uses a separate unicast stream 310A-B of RIP packets 330 for each of the client devices 350A-B. In the present embodiment, the separate unicast streams 310A-B are intended to deliver the same media information (e.g., audio) to each of the client devices 350A-B so that the same media can be presented at the same time from multiple client devices 350A-B. In another embodiment, each of the separate unicast streams 310A-B can be used to deliver separate media information (e.g., audio) to each of the client devices 350A-B. The user may wish to unicast separate media information in some situations, for example, if a first destination of a first unicast stream of audio is a client device in a game room of a house and a second destination of a second unicast stream of different audio is a client device in the garage of the house. Therefore, it may be preferred in some situations to enable to the user to not only select sending the same media information by unicast steams to multiple client devices by to also allow the user to send different media information by separate unicast streams to multiple client devices. The user interface 200 of FIG. 4 can include a drop down menu or other way for the user to make such a related selection.

Separate unicast streams 310 are preferred because multicasting over wireless networks can produce high loss rates and can be generally unreliable. All the same, the disclosed system 300 can use multicasting over the wireless network. In general, though, bandwidth limitations (i.e. fixed multicast rate), negative effects on unicast performance (low-rate multicast slows down other unicast traffic due to multicast packets taking longer), and loss characteristics associated with multicasting over wireless (multicast packets are not acknowledged at the wireless layer) make multicasting less desirable than using multiple, unicast streams 310A-B as preferred. Use of multiple, unicast streams 310A-B does correspond to an increase in bandwidth as additional client devices 350 are added to a group of designated locations for playback. If the average compression rate for audio data is about 75%, the increase in bandwidth associated with multiple, unicast streams 310A-B may correspond to about 1 Mbit/sec bandwidth required for each client device 350 so that the host device 320 can send compressed audio data to the access point (e.g., 30; FIG. 1) and another 1 Mbit/sec so that the access point can forward the compressed audio data to the client device 350.

Once an RTSP session has been started and the RECORD command has been sent from the host device 320 to the client devices 350, the host device 320 begins sending normal RTP packets 330 containing the audio data for playback. These RTP packets 330 are sent at regular intervals, based on the number of samples per second, which can be about 44,100 Hz for audio. The RTP packets 330 are sent at the regular intervals in a throttled and evenly spaced manner in order to approximate the audio playback rate of the remote client devices 350 because the UDP-based connection does not automatically control the sending of data in relation to the rate at which that data is consumed on the remote client devices 350.

Because each of the multiple client devices 350 has their own audio buffers 361, 362, network conditions, etc., it may not be desirable to use a feedback scheme when sending the packets 330. Accordingly, the host device 320 sends audio data at a rate that preferably does not significantly under-run or over-run a playback engine 353 of any of the remote client devices 350. To accomplish this, the host device 320 estimates a fixed delay 340 to insert between packets 330 to maintain the desired audio playback rate. In one embodiment, the packets 330 of audio data are sent with a delay of about 7.982-ms between packets 330 (i.e., 352 samples per packet/44.100 Hz=-7.982-ms per packet), which corresponds to a rate of about 125 packets/sec. Because the delay 340 is fixed, each of the client devices 350 can also detect any skew between its clock and the clock of the sending host device 320. Then, based on the detected skew, each client device 350 can insert simulated audio samples or remove audio samples in the audio it plays back in order to compensate for that skew.

As alluded to above, the RTP packets 330 have timestamps and sequence numbers. When an RTP packet 330 is received by a client device 350, the client device 350 decrypts and decompresses the payload (see Encryption and Compression section below), then inserts the packet 320, sorted by its timestamp, into a packet queue. The two audio buffers 361 and 362 are alternatingly cycled as audio is played hack. Each audio buffer 361 and 362 can store a 250-ms interval of audio. The received RTP packets in the packet queue are processed when one of the two, cycling audio buffers 361 and 362 completes playback. In one embodiment, the audio is USB-based so this is a USB buffer completion process.

To process the queued packets, the engine 353 assembles the queued RTP packets in one of the audio buffers 361 or 362. During the assembly, the engine 353 calculates when each of queued RTP packets should be inserted into the audio stream. The RTP timestamp in the packets combined with time sync information (see the Time Synchronization section below) is used to determine when to insert the packets. The engine 353 performs this assembly process and runs through the queued packets to fill the inactive audio buffer 361 or 362 before the currently playing audio buffer 361 or 362 has completed. Because each of the audio buffers 361 and 362 can store 250-ms of audio, the client device 350 has a little less than 250-ms to assemble all the RTP packets, conceal any losses, and compensate for any clock skew. If there are any gaps in the audio (e.g., the device's audio clock is skewed from the host's audio clock, a packet was lost and not recovered, etc.), then those gaps can be concealed by inserting simulated audio samples or removing existing audio samples.

V. Encryption and Compression

For digital rights management purposes, it is desirable to determine whether the client devices 350 are authorized to receive an audio data stream and/or whether the communications links between the host device 320 and the client devices 350 are secure (encrypted). This requires some form of authentication, which is preferably based on a public key/private key system. In one embodiment, each client station 350 is provided with a plurality of private keys embedded in read only memory (ROM). The media application at the host device 320 is then provided with a corresponding plurality of public keys. This allows identification data transmitted from the networked client devices 350 to the media application to be digitally signed by the client device 350 using its private key, by which it can be authenticated by the media application at the host device 320 using the appropriate public key. Similarly, data sent from the media application at the host device 320 to the networked client stations 350 is encrypted using a public key so that only a client device 350 using the corresponding private key can decrypt the data. The media software and networked media station can determine which of their respective pluralities of keys to use based on the exchange of a key index, telling them which of their respective keys to use without the necessity of transmitting entire keys.

In addition to encryption, the decoded audio data is preferably compressed by host device 320 before transmission to the client devices 350. This compression is most preferably accomplished using a lossless compression algorithm to provide maximum audio fidelity. One suitable compressor is the Apple Lossless Encoder, which is available in conjunction with Apple's iTunes software. The client devices 350 require a decoder for the compression codec used.

The RTP packets 330 are preferably compressed using the Apple Lossless algorithm and are preferably encrypted using the Advanced Encryption Standard (AES) with a 128-bit key size. Loss is still inevitable even though the system 300 uses a UDP-based protocol that attempts to recover from packet loss via retransmission and/or Forward Error Correction (FEC). For this reason, encryption and compression preferably operate on a per-packet basis. In this way, each packet 330 can be completely decoded entirely on its own, without the need for any surrounding packets 330. The Apple Lossless algorithm is used to compress each individual packet 330 rather than compressing a larger stream of audio and packetizing the compressed stream. Although compressing each individual packet 330 may reduce the effectiveness of the compression algorithm, the methodology simplifies operation for the client devices 350 and allows them to be more tolerant to packet loss. Although compression rates are highly dependent on the content, music audio can have an average compression rate of about 75% of the original size when used by the disclosed system 300.

Figure 5B:
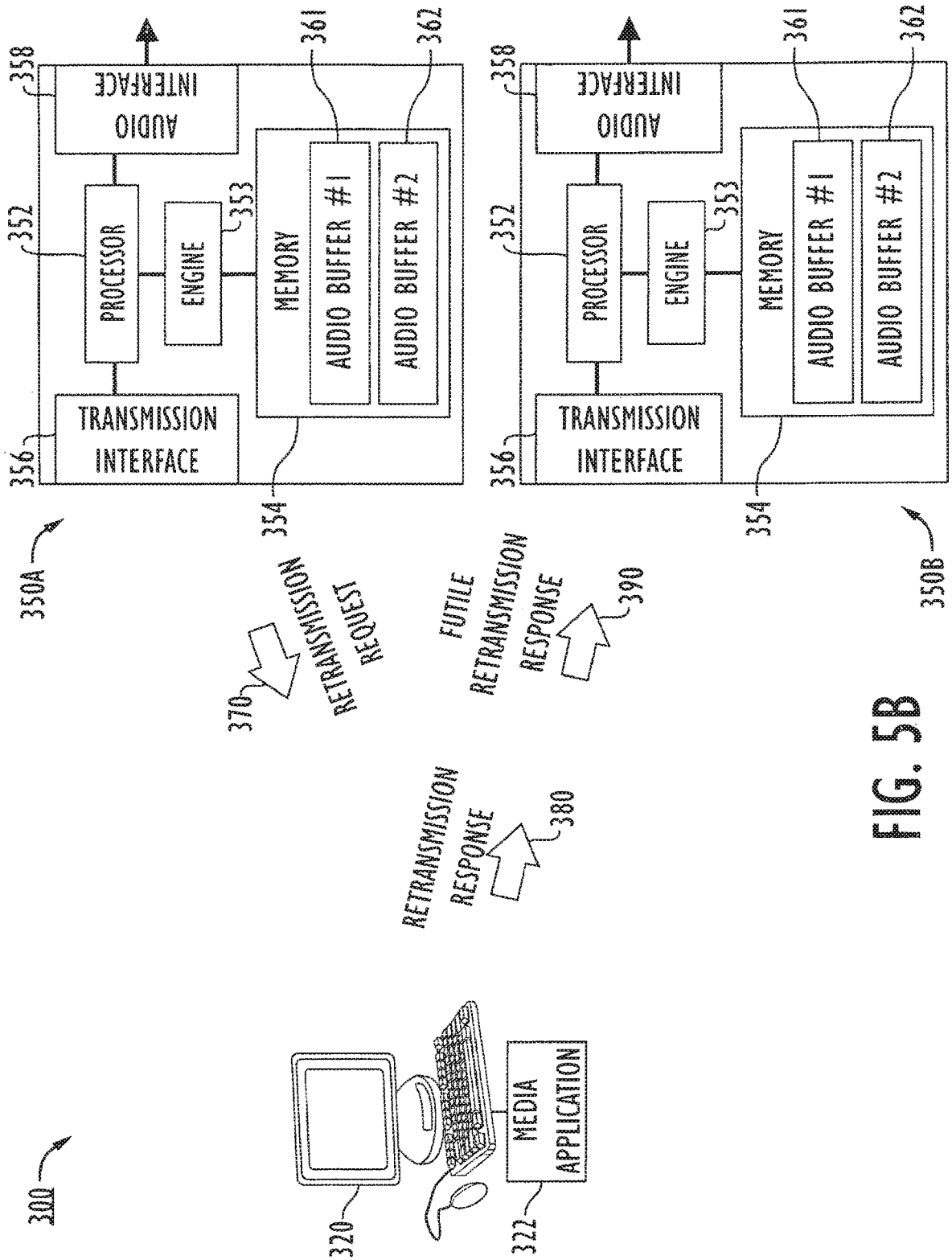
FIG. 5B illustrates portion of the disclosed system having a host device and client devices performing retransmission of lost packet information.

The AES-128 algorithm is used in frame-based cipher block chaining (CBC) mode to encrypt payloads of the RTP packets 330 and the RTP payload portion of RTCP retransmission packets (380; FIG. 5B) discussed below. Because each packet 330 represents a single audio frame, no other packets are required to decrypt each packet correctly. The system preferably supports any combination of encryption and compression, such as both encryption and compression, encryption only, compression only, or neither encryption nor compression. Encryption and compression are configured during the RTSP ANNOUNCE command. The format used to configure encryption and compression is based on the Session Description Protocol (SDP) and embedded as RTSP header fields. Compression uses an SDP "m" (media description) combined with an "rtpmap" and "fmtp" to specify the media formats being used numerically and how those numbers map to actual compression formats and algorithms.

VI. Retransmission of Lost Packets of Audio Data

As noted above, the RTP packets 330 received from the host device 320 have RTP sequence numbers. Based on those RTP sequence numbers, the client device 350 can determine whether packets 330 that have been lost during transmission or for other reasons. The lost RTP packets 330 cannot be queued for playback in the audio buffers 361 and 362 of the client devices 350 so that gaps will result in the audio. To address this issue, the client devices 350 requests that the lost packet(s) be retransmitted. Referring to FIG. 5B, portion of the disclosed system 300 is shown again to discuss how the system 300 attempts to retransmit packets lost during original transmission.

To handle retransmissions, the system 300 preferably uses Real-Time Transport Control Protocol (RTCP) when packet loss is detected. As note above, the sequence numbers associated with the received RTP packets (330; FIG. 5A) are used to determine if any packets have been lost in the transmission. If there is a gap in the sequence numbers, the client device 350 sends a retransmission request 370 to the sender (e.g., host device 320 or other linked client device 350) requesting all the missing packets. In one embodiment, the retransmission request 370 can request up to a maximum of 128 lost packets per detected gap.

In response to the retransmission request 370, the host device 320 sends one or more retransmission responses 380 for lost packets. Due to limitations of the maximum transmission unit (MTU) on RTCP packet sizes, only one response can be sent per retransmission response packet 380. This means that a single retransmission request packet 370 from a device 350 may generate up to 128 retransmission response packets 380 from the host device 320 if all of the lost packets are found in the host's recently sent packets.

Because RTP does not currently define a standard packet to be used for retransmissions, an RTP extension for an RTCP Retransmission Request packet is preferably defined. FIG. 6A shows an example of an RTCP Retransmit Request Packet 370 for use with the disclosed system. The Sequence Number Base refers to the sequence number of the first (lost) packet requested by this RTCP Retransmit Request Packet 370. The Sequence Number Count refers to the number of (lost) packets to retransmit, starting at the base indicated.

In FIG. 5A, the client device 350 sending the RTCP Retransmission Request packet 370 tracks the retransmission requests that it sends in a queue to facilitate sending additional requests if a response to the retransmission request 370 is not received in a timely manner. When a retransmission request 370 has not been responded to in a timely manner, another retransmission request 370 is sent from the client device 350. The process of retrying can be continued until a maximum time has elapsed since the first retransmission request 370 was sent. After that maximum time, it is likely too late to deal with the lost packet anyway because the lost packets time for insertion in one of the audio buffers 361 or 362 has passed.

When multiple, contiguous packets have been lost, the initial retransmit request 370 includes all the missing packets. However, if a response 380 is not received in a timely manner, the missing packets are spread out among multiple requests 370 over time when reattempts are made. Spreading out among multiple requests can maintain a uniform delivery of request and response packets. This also prioritizes packets by time and defers delivery of packets whose presentation time is later.

When the host device 320 receives a retransmission request 370, the host device 320 searches a list of recently sent packets stored at the device 320. If the requested packet in the request 370 is found, the host device 320 sends a retransmission response 380 to the client device 350. An example of an RTP extension for an RTCP Retransmit Response Packet 380 is shown in FIG. 6B. The RTCP Retransmit Response Packet 380 includes the complete RTP packet (e.g., header and payload) being retransmitted. The retransmission packet 380, however, is only sent to the sender of the retransmission request 370, unlike the normal RTP packets (330: FIG. 5A) that are sent to all devices participating in the session.

If the requested packet is not found by the host device 320, however, a negative response 390 is sent so the corresponding client device 350 knows that any further attempt to request that particular packet is futile. An example of an RTP extension for an RTCP Futile Retransmit Response Packet 390 is shown in FIG. 6C. The RTCP Futile Retransmit Response Packet 390 includes the 16-bit sequence number of the failed packet followed by a 16-bit pad containing zero.

In FIG. 5B, the client device 350 receiving a retransmission response packet 380 inserts the packet 380 into the packet queue in the same way used for inserting packets received as part of the normal RTP packet stream discussed above with reference to FIG. 5A. By definition, however, the retransmission response packet 380 is already out-of-sequence and, therefore, does not trigger new retransmission requests based on its sequence number. If an existing packet already exists at the same timestamp as the incoming packet, either via the normal RTP stream or via retransmission, the packet is dropped as a duplicate.

Scheduling retransmission is based on regular reception of RTP packets (330: FIG. 5A) rather than explicit timers. This simplifies the code required and reduces retransmission overhead, but it also throttles retransmission during burst outages (e.g. wireless interference resulting in packet loss during a period). Since retransmissions only occur when RTP packets 330 are received, retransmissions are deferred beyond a possible window when packets 330 may have been lost anyway.

VII. Controlling Relative Volume at Multiple Client Devices During Playback

Because the disclosed system 330 plays music at multiple locations at the same time, it may be desirable to be able to adjust the volume at each location individually. The disclosed system 300 supports individual volume control by using a relative volume setting specified using a header field as part of an RTSP SET PARAMETER request. The volume is expressed as a floating-point decibel level (e.g. 0 dB for full volume). In addition to volume, the disclosed system 330 can set other parameters related to the delivery of media at multiple locations using similar techniques. For example, the disclosed system 300 can be used to set equalization levels at each location individually.

V111. Time Synchronization Between Host Device and Multiple Client Devices

Figure 7:
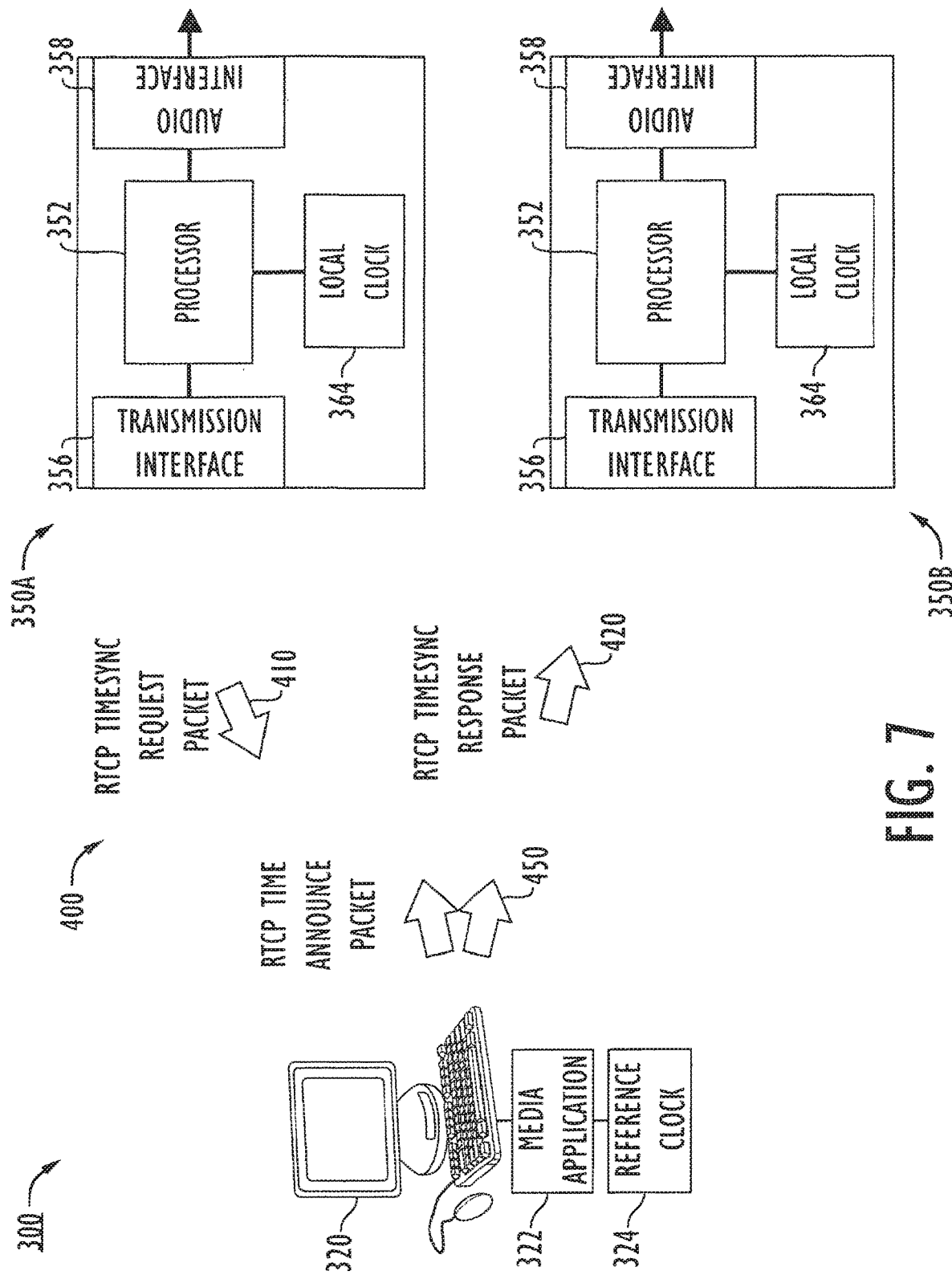
FIG. 7 illustrates portion of the disclosed system having a host device and multiple client devices exchanging time information.

Referring to FIG. 7, portion 300 of the disclosed system is shown having a host device 320 and multiple client devices 350 exchanging timing information. To play the same audio on the multiple client devices 350 in synchronization with each other, the timebase on the multiple client devices 350 is synchronized with a reference clock 324 on the host device 320. As noted previously, the host device 320 can be a Mac or Windows-based system running the media application 322. The host device 320 does not need to run any special server software, and only the media application 322 according to the present disclosure is required. The reference clock 324 at the host device 320 does not need to be synchronized with an external clock, such provided by an NTP server. Rather, the client devices 350 only need to be synchronized to the same reference clock 324 even if that clock 324 is wrong with respect to an external clock.

The reference clock 324 is maintained within the media application 322 running on the host device 320. If the host device 320 is a Macintosh computer, then the reference clock 324 can use the PowerPC timebase registers. If the host device 320 is a Windows-based computer, the reference clock 324 can use the Pentium performance counter registers. The reference clock 324 of the host's media application 322 is separate from the normal wall-clock time of the host device 320, which is maintained by an NTP agent and synchronized to an external clock. The reference clock 324 of the host's media application 322 does not need to be synchronized to an external clock and in some cases this would actually be undesirable. For example, a time difference between the reference clock 324 and the local clock of a client device 350 can be explicitly skewed or adjusted to account for spatial effects or differences, such at the client device 350 being located farther away than another. In addition, there may be situations where a user may want to intentionally skew the clocks to produce effects. Accordingly, the user interface associated with the disclosed system 300, such as interface 200 of FIG. 4, may include a drop-down menu or other control for intentionally manipulating skew.

To synchronize the timebase between the client devices 350 and the host device 320, the media application 322 uses time sync information based on the principals of the Network Time Protocol (NTP) encapsulated in Real-Time Transport Control Protocol (RTCP) packets. Preferably, NTP is not used directly to avoid collisions with existing NTP services (e. g., date/time synchronization with an external clock) and to avoid permission issues due to NTP's use of a privileged port number. Even though the time sync information of the media application 322 is encapsulated in RTCP packets, the time synchronization works substantially the same as NTP and will be referred to as NTP henceforth. NTP is known in the art and provides the basis for intermedia synchronization support in the Real-Time Transport Protocol (RTP). Details of NTP can be found in "Network Time Protocol," RFC 1305, which is available from http://www.ietf.org/rfc/rfc1305.txt and is incorporated herein by reference in its entirety.

Techniques of NTP, however, are preferably not used to provide moment-to-moment time directly to each client device 350 due to issues related to network latency, bandwidth consumption, and CPU resources. Accordingly, techniques of NTP are used for periodic synchronization of time. In addition, each client device 350 is provided with a high-resolution clock 364 based on the local clock hardware of each client device 350 (see Local Clock Implementation section below), the high-resolution clocks 364 are synchronized with the reference clock 324 of the host device 320 using the NTP techniques.

Synchronizing the local clocks 364 of the client devices 350 with the reference clock 324 preferably does not jump to a new time with every correction (referred to as stepping) because stepping can introduce discontinuities in time and can cause time to appear to go backward, which can create havoc on processing code that relies on time. Instead, the time synchronization techniques of the present disclosure preferably correct time smoothly using clock slewing so that time advances in a linear and monotonically increasing manner. In the clock slewing techniques of the present disclosure, frequent micro-corrections, below a tolerance threshold, are performed to the running clocks 364 at the client devices 350 to bring their timebase gradually in sync with the timebase of the reference clock 324 of the host's media application 322. The clock slewing techniques also predict the relative clock skew between the local clocks 364 and the host's reference clock 324 by analyzing past history of clock offsets and disciplining the local clocks 364 to run at the same rate as the host's reference clock 324.

Because a centralized reference clock 324 is used for several client devices 350 on a local network, one way to disseminate time information is to send broadcast/multicast NTP packets periodically from the host device 320 to the client devices 350. Sending NTP packets by multicasting must account for losses and performance degradation that may result from the wireless 802.11b and 802.11g communication links between the host device 320 and the client devices 350. Due to issues of performance degradation, loss rates, and lack of propagation delay information associated with broadcasting or multicasting, unicast NTP transactions 400 are preferably used.

As part of the unicast NTP transactions 400, the client devices 350 periodically send unicast requests 410 to the host device 320 so that the client devices 350 can synchronize their clocks 364 with the reference clock 324. Then, the client devices 350 use responses 420 from the host device 320 corresponding to their requests 410 to continually track the clock offset and propagation delay between the client device 350 and host device 320 so the client devices 350 can update their local clocks 364. Thus, synchronization of the audio playback at the client devices 350 is achieved by maintaining local clocks 364 that are synchronized to the host device's clock 324. Since all client devices participating in a particular session are synchronized to the reference clock 324. When the clocks 324 and 364 are synchronized, the client devices 350 can play audio in-sync without ever communicating with each other.

With the timebase at the client devices 350 synchronized with the reference clock 324 at the host device 320, the client devices 350 can use the synchronized timebase to determine when to playback packets of audio data. As noted previously, audio data is delivered to the client devices 350 using RTP packets (330; FIG. 5A) that contain an RTP timestamp describing the time of a packet's audio relative to other packets in the audio stream. The client device 350 uses this timestamp information to reconstruct audio at the correct presentation time for playback. Accordingly, each client device 350 correlates the NTP timebase of its local clock 364 with the RTP timestamps provided in the RTP packets of the audio stream.

With respect to the unicast requests and responses 410 and 420 noted above, RTP does not define a standard packet format for synchronizing time. There is an RTCP sender report, which contains some timing information, but not everything that is needed to synchronize time (e.g., there is no originate time for receivers to determine the round trip time). There are also rules preventing sender reports from being sent before any RTP data has been sent, which is critical for playing the initial audio samples in sync.

Figure 8A:
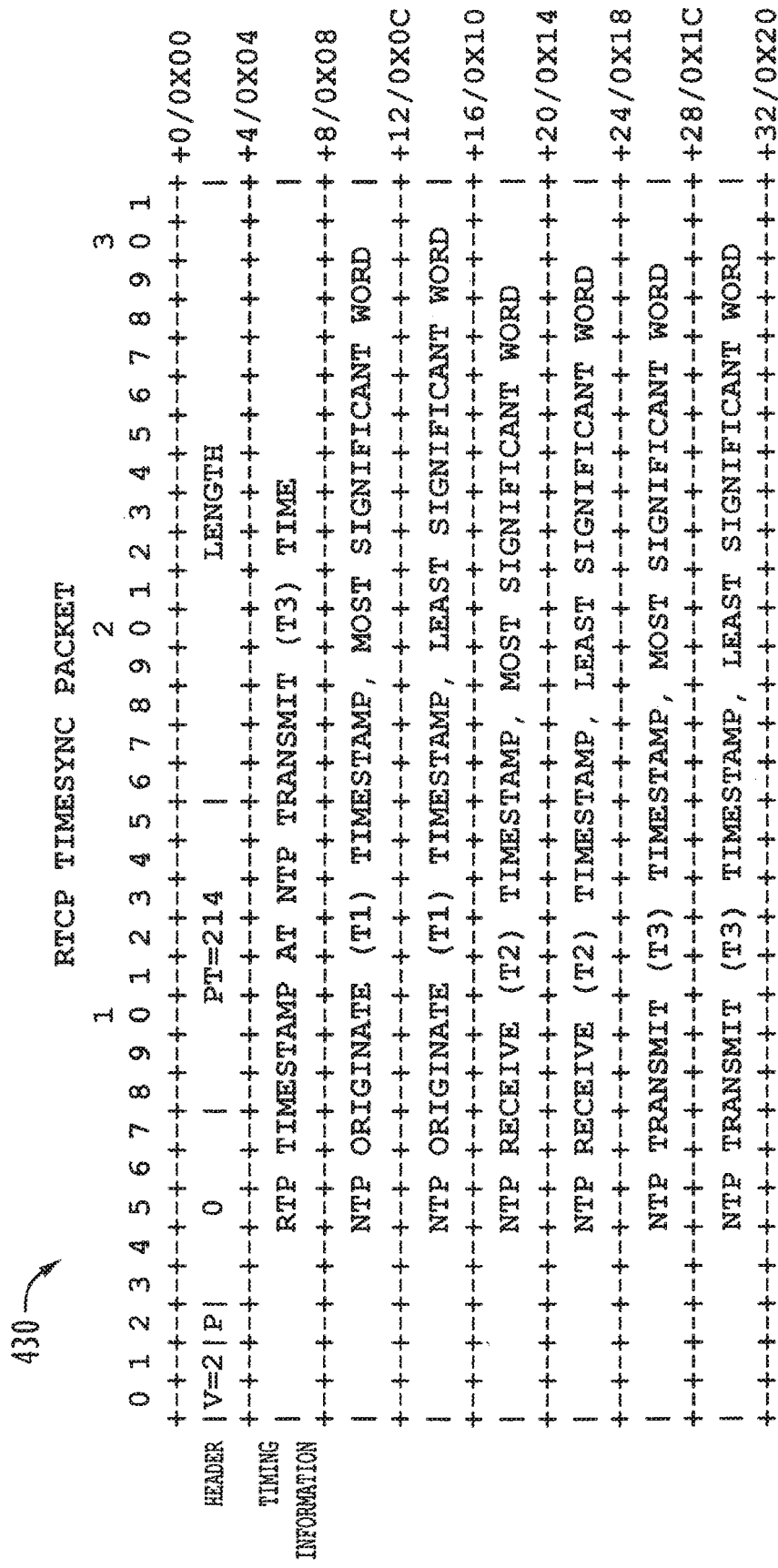
FIG. 8A illustrates an embodiment of a packet for synchronizing time.

Therefore, the host's media application 322 preferably defines an RTP extension for an RTCP TimeSync packet for the requests and responses 410 and 420. An embodiment of an RTCP TimeSync packet 430 is shown in FIG. 8A. The RTCP TimeSync Packet 430 includes a header, the RTP timestamp at NTP Transmit (T3) time, NTP Originate (T1) timestamp, most significant word; NTP Originate (T1) timestamp, least significant word; NTP Receive (T2) timestamp, most significant word; NTP Receive (T2) timestamp, least significant word; NTP Transmit (T3) timestamp, most significant word: NTP Transmit (T3) timestamp, least significant word. The Marker bit (M) is not used for these TimeSync packets 430. The packet types (PT) include '210' for a client device request to synchronize time in a manner similar to an NTP client device request and include '211' for a host device response to a client device request. The 'RTP Timestamp' is the RTP timestamp at the same instant as the transmit time (T3). This should be 0. The times T1-T3 come from NTP and are used in the same manner as NTP.

In FIG. 7, the RTCP TimeSync request packets 410 from the client devices 350 are sent once the RTSP RECORD command is received so that the client devices 350 can initially synchronize time. Then, the client devices 350 periodically send RTCP TimeSync request packets 410. In one embodiment, the periodic intervals for synchronizing time can be at random intervals between two and three seconds apart. The RTCP TimeSync response packets 420 are sent by the host device 320 in response to receiving a valid RTCP TimeSync request packet 410.

The host's media application 322 also defines an RTP extension for an RTCP TimeAnnounce packet 450. The RTCP TimeAnnounce packets 450 are sent periodically (e.g., once a second) by the host device 320 to update the client devices 350 with the current timing relationship between NTP and RTP. The RTCP TimeAnnounce packets 450 can be sent sooner if the host device 320 changes the NTP to RTP timing relationship. For example, when a new song starts, the host's media application 322 can send a new RTCP TimeAnnounce packet 450 with the marker bit (M) set to indicate that the NTP to RTP timing relationship has changed.

Figure 8B:
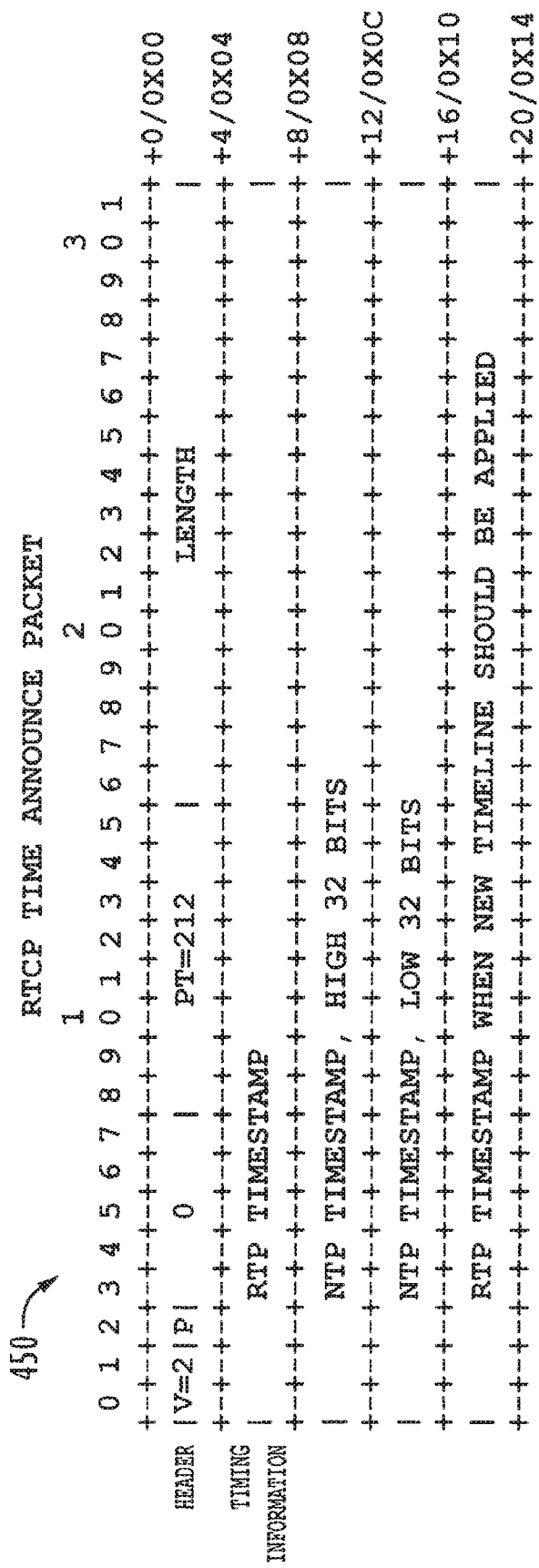
FIG. 8B illustrates an embodiment of a packet for announcing time.

As shown in the embodiment of FIG. 8B, the RTCP TimeAnnounce Packet 450 includes an RTP timestamp; an NTP timestamp, high 32 bits; an NTP timestamp, low 32 bits; and an RTP timestamp when the new timeline should be applied. The Marker bit (M) is used to indicate an explicit change in the NTP to RTP timing relationship. The packet type (PT) is defined as '212' to indicate that the host device is announcing a new NTP to RTP relationship. The "RTP Timestamp" is the RTP timestamp at the same instant as the NTP timestamp. The "NTP Timestamp" is the NTP timestamp at the same instant as the RTP timestamp. The field "RTP Apply Timestamp" refers to the RTP timestamp when the new timeline should be applied.

IX. Local Clock Implementation at Host Device

Returning to FIG. 7, the local clock 364 of the client device 350 is discussed in more detail. The local clock 364 maintains a 64-bit nanoseconds counter that starts at zero on system boot and uses the 60-Hz clock interrupt to increment the nanoseconds counter. When an interrupt occurs, the 32-bit timer counter is used to determine how much time has passed since the last clock interrupt. This determined amount of time since the last clock interrupt is referred to as the tick delta and is in units of $\frac{1}{100}$ of a microsecond. The tick delta is then converted to nanoseconds and is added to the nanoseconds counter to maintain the current time. The tick delta is used in this manner to avoid drift due to interrupt latency.

To maintain more accurate time, it may be preferable to allow time to be adjusted gradually. Accordingly, the nanoseconds counter is adjusted in very small increments during each clock interrupt to "slew" to the target time. These small increments are chosen based on a fraction of the amount of adjustment needed and based on the tick delta. This prevents time from appearing to go backward so that time always increases in a linear and monotonic manner.

Additionally, the client device 350 can predict what the next NTP clock offset will be in the future to further adjust the local clock 364. To make the prediction, the client device 350 uses a moving average of NTP clock offsets to estimate the slope of the clock skew between each of client device 350 and host device 320. This slope is then extrapolated to estimate the amount of adjustment necessary to keep the local clock 364 at the client device 350 in sync with the reference clock 324. The client device 350 then makes very small adjustments to the per-clock interrupt increment, in addition to the adjustments made for clock stewing, to simulate the faster or slower clock frequency of the host's reference clock 324. This allows the local clock 364 to remain synchronized between NTP update intervals and may even allow the reference clock 324 to remain synchronized in the absence of future NTP clock updates).

X. Simulated Timelines for Audio Playback

Figure 9:
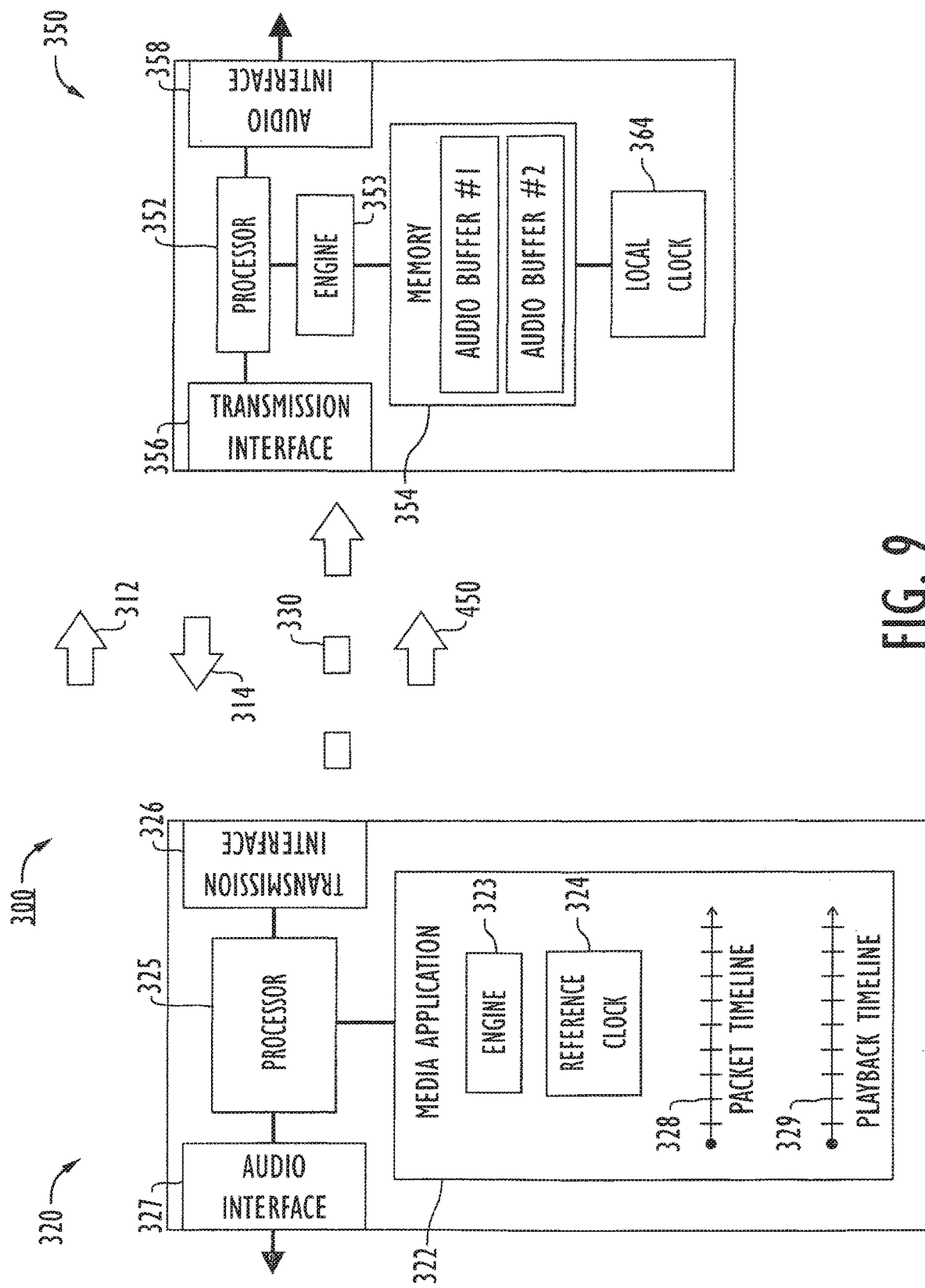
FIG. 9 illustrates portion of the disclosed system having a host device and a client device.

Referring to FIG. 9, additional details related to synchronized delivery of media with multiple client devices are discussed. In FIG. 9, portion of the network media delivery system 300 is again illustrated. The host device 320 is schematically shown having the media application 322 and reference clock 324, as described previously. In addition, the host device 320 is schematically shown having an engine 323, a processor 325, a transmission interface 326, and an audio interface 327. As disclosed herein, the host device 320 can be a computer. Therefore, the processor 325 can be a conventional computer processor, the transmission interface 326 can be a Wi-Fi compatible wireless network interface, and the audio interface 327 can be a sound card or the like for playing audio. In addition, the media application 322 can be a software program stored in memory on the computer and operating on the computer processor 325. Furthermore, the media application 322 can include the engine 324 for processing media (e.g., audio) data and can include the reference clock 324 for synchronizing time.

To play audio in a synchronized manner on multiple client devices 350 (only one of which is shown in FIG. 9), audio data needs to be scheduled for playback at a constant or consistent rate. One way to achieve this is for the media application 322 on the host device 320 to send packets 330 of audio data at a constant rate and to have the timeline for presenting that audio data with the client device 350 tied to the send rate of the packets 330. For example, packets of audio data can be sent about every 7.982-ms (i.e., 352 samples per packet/44,100 Hz=~7.982-ms per packet, which corresponds to a rate of about 125 packets/sec), and the timeline for presenting that audio can correspond directly to this rate. While this works, the send rate of the packets 330 and the presentation timeline at the client device 350 must have a one-to-one correspondence, which can restrict the ability to buffer the audio data at the client device 350. As discussed herein, buffering of the audio data at the client devices 350 is desirable for handling lost packets, clock skew, etc. If five seconds of buffering is desired at the client device 350, there will be a five-second delay between the time when the audio data arrives at the client device and the time when it is actually played. Unfortunately, users can readily perceive such a high level of latency when buffering is used with such a one-to-one correspondence between the packet send rate and the presentation time of the audio.

To provide buffering without this high level of latency, the sending of packets 330 is preferably decoupled or separated from the timeline for presenting the audio data of those packets 330. To achieve this, the media application 322 maintains two simulated timelines 328 and 329. A first packet timeline 328 corresponds to when packets 330 should be sent, and a second playback timeline 329 corresponds to when the audio data in those packets 330 should be presented or delivered (i.e., played for the user). The separate timelines 328 and 329 allow the send rate of the packets 330 to vary as needed so that the system 300 can provide buffering without introducing latency. If more buffering is needed, for example, the packet send rate of the first packet timeline 328 can be temporarily increased to front-load the buffers in memory 354 on the client devices 350 and can be later reduced back to the real-time send rate of the packets 330. The separate timelines 328 and 329 also avoid problems associated with fluctuations in the presentation time of audio caused by scheduled latency of the operating systems on the devices.

The second playback timeline 329, which corresponds to when the audio data in the packets 330 should be presented or delivered, is constructed by the host device 320. Using the reference clock 324 and a desired playback rate of the audio, the host device 320 estimates the number of audio samples that would have played at a given point in time at the client device 350 to construct the playback timeline 329. This second playback timeline 329 is then published from the host device 320 to the client devices 350 as part of the time announcements 450 sent periodically from the host device 320 to the client devices 350. As discussed in greater detail previously, the client device 350 uses the periodic time announcements 450 to establish and maintain the relationship between the RTP timestamps in the audio packets 330 and the corresponding NTP presentation time for the audio packets 330 so that the client device 350 can deliver the audio in synch with other devices.

By having the send rate of the packets 330 (represented by the packet timeline 328) separate from the presentation time (represented by the playback timeline 329), the periodic time announcements 450 are not designed to take effect immediately when received by the client devices 350 since the announcements 450 may come in advance of when they are effective. As noted previously, however, the time announcement packets 450 contain an additional RTP timestamp that indicates when the announced time should take effect at the client device 350. Therefore, a time announcement packet 450 is saved at a client device 350 once it is received. When audio playback reaches the RTP timestamp of that saved time announcement packet 450, the client device 350 applies the time change contained in that saved time announcement package 450.

To play audio in a synchronized manner on multiple client devices 350 (only one of which is shown in FIG. 9), it is also preferred to consider the amount of latency or delay between the time when the audio data is scheduled to be delivered at the device 350 and the time when the audio is actually delivered by the device 350 (and associated entertainment devices). Different types of client devices 350 (and associated entertainment devices) will typically have different latency characteristics. Accordingly, the disclosed system 300 preferably provides a way for each client device 350 to report its latency characteristics (and that of its associated entertainment device) to the host device 320 so that these latency characteristics can be taken into consideration when determining how to synchronize the playback of media at the client devices 350.

Determination of the latency characteristics of the client devices 350 preferably occurs at initial set up of the system 300. For example, the media application 322 at the host device 320 sends RTSP SETUP requests 312 to the client devices 350 at initial set up. In responses 314 to the RTSP SETUP requests 312, the client devices 350 use a header field to report the latency characteristics associated with the client devices 350. The values of the field are preferably given as the number of RTP timestamp units of latency. For example, a client device 350 having 250-ms of latency at a 44,100-Hz sample rate would report its audio-latency as 11025 RTP timestamp units. Based on the reported latency characteristics from the client devices 350, the host's media application 322 determines a maximum latency of all client devices 350 in the group being used for playback. This maximum latency is then added to the playback timeline 329.

XI. Synchronized Local Playback at Host Device

In addition to synchronized playback at multiple client devices 350, the disclosed system 300 allows for synchronized local playback at the host device 320 running the media application 322. For example, the host device 320 can play the same audio to its local speakers (not shown) that is being played by the client devices 350, and the host device 350 can have that same audio play in sync with the all the other devices 350. To achieve this, the host device 320 uses many of the same principles as applied to the client devices 350. Rather than receiving packets of audio data over a wireless network, however, audio data is delivered directly to a local playback engine 323 of the media application 322. In addition, because local playback on the host device 320 is handled by the media application 322, there is no need for the host device 320 to synchronize time with its own reference clock 324.

The packets of audio data delivered to the synchronized local playback engine 323 within the media application 322 are generated before being compressed and encrypted. Since these packets do not leave media application 322, no compression or encryption is necessary. In one embodiment, the host device 320 uses CoreAudio to playback audio. CoreAudio can be used for both Mac-based or Windows-based computers because QuickTime 7 provides support for CoreAudio on Windows-based computers. During operation, an output AudioUnit is opened, and a callback is installed. The callback is called when CoreAudio needs audio data to play. When the callback is called, the media application 322 constructs the relevant audio data from the raw packets delivered to it along with the RTP→NTP timing information. Since CoreAudio has different latency characteristics than the latency characteristics associated with the client devices 350, information is also gathered about the presentation latency associated with the audio stream of CoreAudio. This information is used to delay the CoreAudio audio stream so that it plays in sync with the known latency of the audio streams associated with the client devices 350.

XII. Stutter Avoidance During Audio Playback

Figure 10:
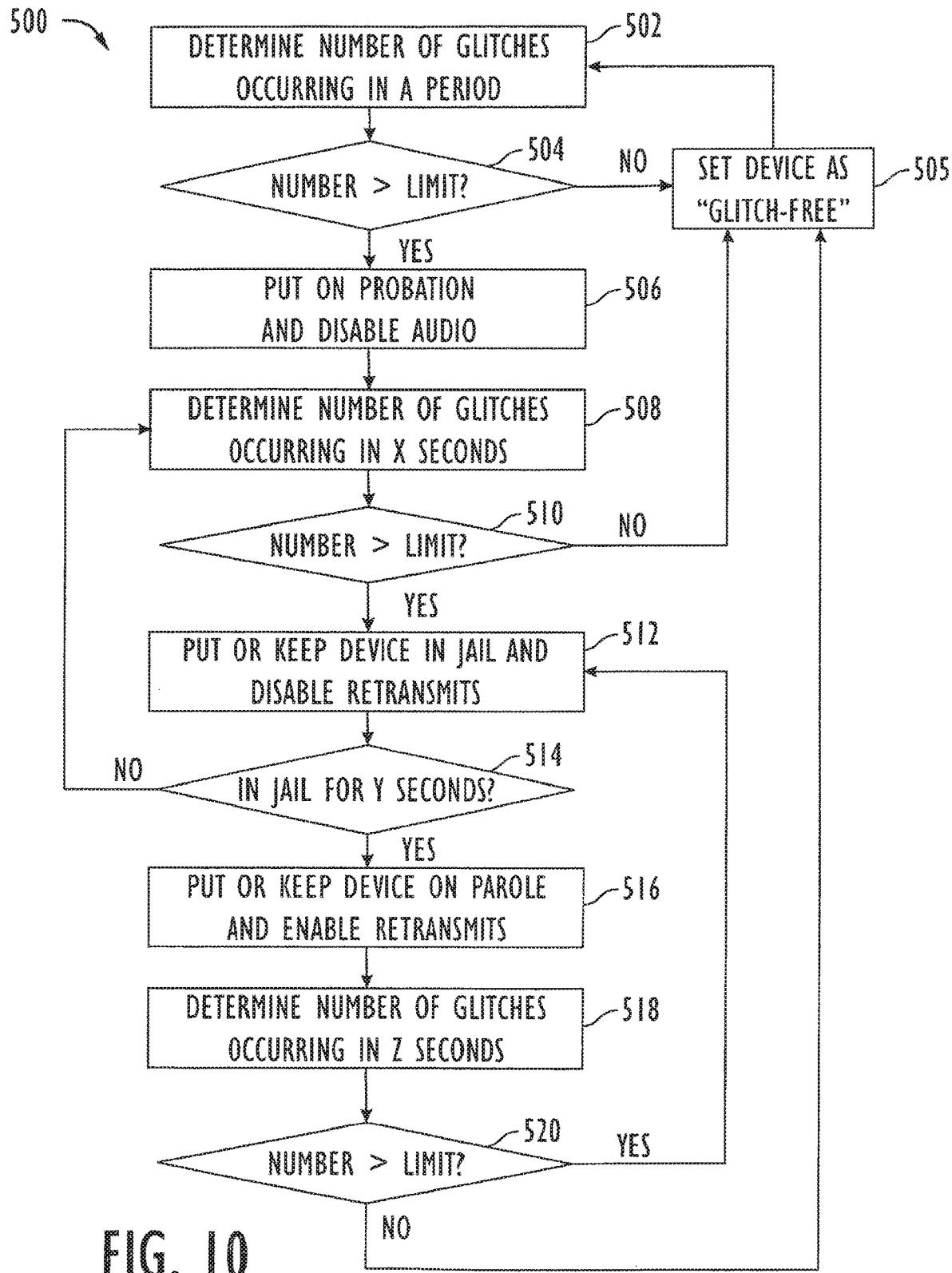
FIG. 10 illustrates an algorithm to limit stuttering in playback of audio.

In addition to the techniques discussed previously for handling lost RTP packets of audio data and for synchronizing clocks between the host device 320 and the client devices 350, the disclosed system 300 preferably limits stuttering in the playback of media. Referring to FIG. 10, an algorithm 500 for limiting stutter in the playback of media is shown in flowchart form. This algorithm 500 can be performed by the host device of the disclosed system for each of the client devices. Using the algorithm 500, the disclosed system detects audible "glitches" caused by gaps in the media (e.g., audio). These gaps can be caused by loss of packets, packets arriving too late, changes to the synchronized timeline, large amounts of clock skew, or other reasons. First, the system determines the number of such "glitches" occurring in a period of time for each of the client devices (Block 502). Then, a determination is made whether the number of glitches is greater than a predetermined limit (Block 504). For example, the audio is analyzed over a period of 250-ms to determine whether the 250-ms period is either "glitching" (bad) or "glitch-free" (good). A credit system is used to make this determination. Each time a glitching period is detected, the system takes away a number of credits from a credit score of the client device. The credit score is capped at a minimum value to prevent a long sequence of glitching periods from requiring protracted period of time for the client device to recover, because the intention is to allow the client device to recover quickly as soon as its audio situation clears up.

If the number of credits goes below a predefined threshold at Block 504, the client device is put on probation (Block 506). When on probation, audio is disabled and silenced, but the client device can still send retransmit requests to the host device as needed to recover lost packets of audio data. The audio is silenced during probation so that the client device will not produce an annoying stutter sound when a significant number of glitching periods are successively delivered in an interval of time. Even though the audio is silenced, retransmits remain enabled so that operation of the client device can improve to a point suitable to resume playback.

If the number of glitches is not greater than the limit at Block 504, then the client device is set as "glitch free" (Block 505). Each time a "glitch-free" period is detected, for example, a number of credits is added to the credit score for the client device. The number of credits is capped at a maximum value to prevent a long sequence of glitch-free periods from extending the number of glitches required before going into stutter avoidance mode because the intention is to be able to go into stutter avoidance mode quickly so that there is not any significant stutter produced.

For the client device on probation with audio silenced and retransmits enabled, the number of glitches occurring in a predetermined unit of time (e.g., X seconds) is determined (Block 508). The number of glitches is compared to a predetermined limit or threshold (Block 510). If the client device is on probation for the predetermined unit of time (X seconds) and the number of credits reaches an upper threshold at Block 510, the client devices is placed back into normal playback mode at Block 505.

If the client device remains on probation for the predetermined unit of time (X seconds) and the number of credits has not reached an upper threshold at Block 510, then the client device is put in jail (Block 512). When in jail, the audio remains disabled and silenced. However, retransmits are now disabled. In this situation, the client device has not recovered for a significant period of time, and any retransmits may actually be making the situation worse. By disabling retransmits, the recovery time may be improved by reducing congestion on the network. In addition, disabling retransmits may at least reduce the amount of traffic on the network and may allow other client devices to receive packets of audio data more reliably.

If the client device remains in jail for a predetermined unit of time (e.g., Y seconds) at Block 514, the client device goes on parole to see if its situation has improved (Block 516). When on parole, audio is still disabled and silenced. However, retransmits are re-enabled. The number of glitches occurring in a predetermined unit of time (e.g., Z seconds) is determined (Block 518) and compared to a predetermined limit (Block 520). If the client device is on parole for the predetermined unit of time and the number of credits reaches an upper threshold at Block 520, then client device returns to normal playback mode at Block 505 where audio and retransmits are both enabled. If the client device stays on parole for the predetermined unit of time and the number of credits does not reach the upper threshold at Block 520, however, the client device goes back to jail at Block 512.

XIII. Handling Address Resolution Protocol

With reference again to FIG. 5A, for example, the high volume of data being exchanged by the disclosed system 300 can cause Address Resolution Protocol (ARP) requests, which are broadcast, to become lost. This may be the case especially when the ARP requests are wirelessly broadcast. Address Resolution Protocol (ARP) is a network protocol used to map a network layer protocol address to a data link layer hardware address. For example, ARP can be used to resolve an IP address to a corresponding Ethernet address. When ARP requests are lost, ARP entries at the host device 320 can expire and can fail to be renewed during operation of the disclosed system 300 so that connections between the host device 320 and client devices 350 may appear to go down. Because steady, unicast streams 310 of packets 330 are being exchanged during operation of the disclosed system 300, one solution to this problem is to extend the expiration times of the ARP entries at the host device 320 as long as packets 330 from the host device 320 are being received by the client devices 350. By extending the expiration time, the ARP entry for a given client device 350 does not time out (as long as packets 330 are being received by that client device 350), and the client device 350 does not need to explicitly exchange ARP packets, which may tend to get lost as noted previously, with the host device 320.

In another solution, the client devices 350 periodically (e.g., once a minute) send unsolicited, unicast ARP request packets (not shown) to the host device 320. These unicast ARP request packets contain source addresses (Internet Protocol (IP) address and the hardware address of the client device 350) and target addresses (IP address and hardware address of the host device 320). The unicast ARP request packets are more reliable than broadcast packets because the unicast packets are acknowledged and retried at a wireless layer. To keep the ARP entries on the host device 320 for the client devices 350 from expiring, the host device 320 updates its ARP cache when it receives these unicast ARP request packets by refreshing the timeout for the corresponding ARP entries. This prevents the host device 320 from needing to issue a broadcast ARP request when the ARP entry for a client device 350 expires because the ARP entries effectively never expire as long as the client devices 350 unicast ARP request packets to the host device 320.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method comprising:
   discovering, by a host device, one or more client devices capable of media playback;
   presenting, by the host device, a graphical object for configuring media playback devices for media items selected by a user at the host device;
   receiving, by the host device, a user selection of the graphical object;
   in response to receiving the selection of the graphical object, presenting identifiers for a plurality of candidate media playback devices, the candidate media playback devices including the discovered client devices and the host device;
   receiving, by the host device, user input selecting one or more of the candidate media playback devices; and
   causing, by the host device, playback of a selected media item by the selected media playback devices.

2. The method of claim 1, further comprising:
   receiving, by the host device, user input selecting a media item; and
   sending, by the host device, the selected media item to the selected media playback devices for playback.

3. The method of claim 2, wherein sending the selected media item to the selected media playback devices for playback includes streaming the selected media item from the host device to at least one of the selected media playback devices.

4. The method of claim 1, further comprising:
   receiving, by the host device over a network, information identifying the one or more client devices and capabilities associated with each of the one or more client devices;
   determining, by the host device, that the one or more client devices are capable of receiving streamed media data based on the received capabilities associated with the one or more client devices; and
   presenting, by the host device, the one or more client devices as candidate media playback devices based on the determination that the one or more client devices are capable of receiving and playing back streamed media data.

5. The method of claim 1, wherein the host device and each of the one or more client devices is connected to a network access point; and further comprising:
   sending the selected media item to the selected media playback devices through the network access point.

6. The method of claim 1, further comprising:
   coordinating, by the host device, synchronization of playback of the selected media item at the selected media playback devices.

7. The method of claim 1, wherein the selected media playback devices include the host device and at least one of the one or more client devices.

8. The method of claim 1, wherein the graphical object is presented in a media playback application of the host device.

9. The method of claim 1, further comprising:
   synchronizing, by the host device, playback of the media item at the host device with playback of the media item at a selected media playback device based on a playback latency determined for the selected media playback device.

10. The method of claim 1, further comprising:
    causing, by the host device, playback of a second media item by a second of the selected media playback devices simultaneous to playback of the selected media item by a first of the selected media playback devices.

11. A host device comprising:
    one or more processors;
    a network interface device; and
    a non-transitory computer readable medium that includes one or more sequences of instructions that, when executed by the one or more processors, cause the processors to perform operations comprising:
    discovering, by the host device through the network interface device, a plurality of media playback devices from amongst a plurality of client devices, the plurality of media playback devices being capable of playback of media items selected by a user at the host device;
    presenting, by the host device, a graphical object for configuring the plurality of media playback devices for playback of the media items selected by the user at the host device;
    receiving, by the host device, a user selection of the graphical object;

in response to receiving the selection of the graphical object, presenting identifiers for a plurality of candidate media playback devices in a single user interface element, the candidate media playback devices including the plurality of media playback devices and the host device;

receiving, by the host device, user input selecting one or more of the candidate media playback devices; and causing, by the host device, playback of a selected media item by the selected media playback devices.

12. The host device of claim 11, wherein the instructions cause:

receiving, by the host device, user input selecting a media item; and sending, by the host device, the selected media item to the selected media playback devices for playback.

13. The host device of claim 12, wherein the instructions that cause sending the selected media item to the selected media playback devices for playback include instructions that cause streaming the selected media item from the host device to at least one of the selected media playback devices through the network interface device.

14. The host device of claim 11, wherein the instructions cause:

receiving, by the host device from the plurality of client devices through the network interface device, information identifying the plurality of client devices and capabilities associated with each of the plurality of client devices;

determining, by the host device, that the plurality of media playback devices are capable of receiving and playing back streamed media data based on the received capabilities associated with the plurality of client devices; and presenting, by the host device, the plurality of media playback devices as candidate media playback devices based on the determination that the plurality of media playback devices are capable of receiving and playing back streamed media data.

15. The host device of claim 11, wherein the host device and each of the plurality of client devices is connected to a network access point; and wherein the instructions cause:

sending the selected media item to the selected media playback devices through the network access point.

16. The host device of claim 11, wherein the instructions cause:

coordinating, by the host device, synchronization of playback of the selected media item at the selected media playback devices.

17. The host device of claim 11, wherein the selected media playback devices include the host device and at least one of the plurality of client devices.

18. The host device of claim 11, wherein the graphical object is presented in a media playback application of the host device.

19. The host device of claim 11, wherein the instructions cause:

synchronizing, by the host device, playback of the media item at the host device with playback of the media item at a selected media playback device based on a playback latency determined for the selected media playback device.

20. The host device of claim 11, wherein the instructions cause:

causing, by the host device, playback of a second media item by a second of the selected media playback devices simultaneous to playback of the selected media item by a first of the selected media playback devices.

* * * * *